US010671088B2

(12) United States Patent
Lutz et al.

(10) Patent No.: US 10,671,088 B2
(45) Date of Patent: *Jun. 2, 2020

(54) COMMUNICATION OF INFORMATION REGARDING A ROBOT USING AN OPTICAL IDENTIFIER

(71) Applicant: X Development LLC, Mountain View, CA (US)

(72) Inventors: Kyle Lutz, San Mateo, CA (US); Ethan Rublee, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 15/595,145

(22) Filed: May 15, 2017

(65) Prior Publication Data

US 2017/0248966 A1 Aug. 31, 2017

Related U.S. Application Data

(63) Continuation of application No. 14/922,738, filed on Oct. 26, 2015, now Pat. No. 9,682,481.

(51) Int. Cl.
*G05D 1/02* (2020.01)
*B25J 9/16* (2006.01)
(Continued)

(52) U.S. Cl.
CPC ............ *G05D 1/0291* (2013.01); *B25J 5/007* (2013.01); *B25J 9/0084* (2013.01); *B25J 9/1682* (2013.01);
(Continued)

(58) Field of Classification Search
CPC ...... B25J 9/1697; B25J 9/0084; B25J 9/1684; B25J 9/1694; B25J 13/08; B25J 13/087;
(Continued)

(56) References Cited

U.S. PATENT DOCUMENTS

| 4,611,292 A | 9/1986 | Ninomiya et al. |
| 5,825,981 A | 10/1998 | Matsuda |

(Continued)

FOREIGN PATENT DOCUMENTS

| TW | 200616403 A | 5/2006 |
| TW | 200924926 A | 6/2009 |
| TW | 201414656 A | 4/2014 |

OTHER PUBLICATIONS

Communication Pursuant to Rule 62 EPC dated May 29, 2019 with Supplemental European Search Report completed on Feb. 14, 2019, issued in connection with European Patent Application No. EP16860584, filed on Oct. 25, 2016, 11 pages.

(Continued)

*Primary Examiner* — Bao Long T Nguyen
(74) *Attorney, Agent, or Firm* — McDonnell Boehnen Hulbert & Berghoff LLP

(57) ABSTRACT

A control system may perform functions including (i) storing data indicating an association between an optical identifier and a first robot, (ii) sending, to the first robot, data encoding the optical identifier for display by the first robot, and (iii) after sending the data encoding the optical identifier, sending, to a second robot, the data indicating the association between the optical identifier and the first robot. In some examples, the first robot may receive, from the control system, data encoding a second optical identifier of the first robot so that the first robot may display the second optical identifier instead of the first optical identifier. In some examples, a first robot may capture an image of an indication of a priority status of a second robot and perform an action based on comparing a first priority status of the first robot to the second priority status of the second robot.

20 Claims, 17 Drawing Sheets

(51) Int. Cl.
*B25J 9/00* (2006.01)
*B25J 19/02* (2006.01)
*B25J 5/00* (2006.01)

(52) U.S. Cl.
CPC ............ *B25J 9/1697* (2013.01); *B25J 19/021* (2013.01); *G05B 2219/32266* (2013.01); *G05B 2219/39118* (2013.01); *G05B 2219/40298* (2013.01); *G05D 2201/0216* (2013.01); *Y02P 90/20* (2015.11); *Y10S 901/01* (2013.01); *Y10S 901/47* (2013.01)

(58) Field of Classification Search
CPC ........ B25J 5/007; B25J 9/1682; B25J 19/021; Y10S 901/01; Y10S 901/47; Y10S 901/50; Y02P 90/20; G05B 19/4183; G05B 2219/39117; G05B 2219/39166; G05B 2219/40001; G05B 2219/32266; G05B 2219/39118; G05B 2219/40298; G05D 1/0291; G05D 2201/0216
USPC ...... 700/247, 248, 250, 258, 259; 901/1, 47, 901/50; 701/29.6
See application file for complete search history.

(56) References Cited

U.S. PATENT DOCUMENTS

| | | | |
|---|---|---|---|
| 5,845,000 A | 12/1998 | Breed et al. | |
| 5,889,865 A | 3/1999 | Vanstone et al. | |
| 6,687,571 B1 | 2/2004 | Byrne et al. | |
| 8,108,071 B2 | 1/2012 | Lin et al. | |
| 8,290,619 B2 | 10/2012 | McLurkin et al. | |
| 8,359,127 B2 | 1/2013 | Wang et al. | |
| 8,594,923 B2 | 11/2013 | Wong et al. | |
| 8,757,490 B2 | 6/2014 | Lemma et al. | |
| 8,918,208 B1 | 12/2014 | Hickman et al. | |
| 2007/0192910 A1 | 8/2007 | Vu et al. | |
| 2008/0205892 A1 | 8/2008 | Baiden | |
| 2009/0030551 A1 | 1/2009 | Hein et al. | |
| 2011/0106362 A1 | 5/2011 | Seitz | |
| 2011/0303748 A1* | 12/2011 | Lemma | G06K 7/1417 235/454 |
| 2016/0259329 A1 | 9/2016 | High et al. | |
| 2016/0288330 A1 | 10/2016 | Konolige | |

OTHER PUBLICATIONS

Manca, S. et al., "Decentralized Coordination System for Multiple AGVs in a Structured Environment," Proceedings of the 18th World Congress, IFAC the 2012 IFAC Workshop on Automatic Control in Offshore Oil and Gas Production, vol. 44, No. 1, Jan. 1, 2011, pp. 6005-6010, Milano (Italy) Aug. 28-Sep. 2, 2011.

Wang, Jing, "On Sign-board Based Inter-Robot Communication in Distributed Robotic Systems," Proceedings of the 1994 International Conference on Robotics and Automation, San Diego, CA, USA, May 8, 1994, IEEE Computer Society 1994, pp. 1045-1050.

Written Opinion of the International Searching Authority dated Feb. 1, 2017, issued in connection with International Application No. PCT/US2016/058569, filed on Oct. 25, 2016, 4 pages.

International Search Report dated Feb. 1, 2017, issued in connection with International Application No. PCT/US2016/058569, filed on Oct. 25, 2016, 3 pages.

* cited by examiner

COMMUNICATION OF INFORMATION REGARDING A ROBOT USING AN OPTICAL IDENTIFIER

CROSS REFERENCE TO RELATED APPLICATIONS

This application claims priority under 35 U.S.C. § 120 to, and is a continuation of, U.S. patent application Ser. No. 14/922,738, filed on Oct. 26, 2015, entitled "Communication of Information Regarding a Robot Using an Optical Identifier," which is incorporated herein by reference in its entirety.

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also include rows of pallet racks for storage of pallets, and flat transport structures that contain stacks of boxes or other objects. Additionally, the warehouse may have machines or vehicles for lifting and moving goods or pallets of goods, such as cranes and forklifts. Human operators may be employed to operate machines, vehicles, and other equipment within the warehouse. In some cases, one or more of the machines or vehicles may be robotic devices guided by computer control systems.

SUMMARY

In one example, a control system includes one or more processors and a computer-readable storage medium storing instructions that, when executed by the one or more processors, cause the control system to perform functions. The functions include storing data indicating an association between an optical identifier and a first robot, sending, to the first robot, data encoding the optical identifier for display by the first robot, and after sending the data encoding the optical identifier, sending, to a second robot, the data indicating the association between the optical identifier and the first robot.

In another example, a computer-readable medium stores instructions that, when executed by a control system, cause the control system to perform functions. The functions include storing data indicating an association between an optical identifier and a first robot, sending, to the first robot, data encoding the optical identifier for display by the first robot, and after sending the data encoding the optical identifier, sending, to a second robot, the data indicating the association between the optical identifier and the first robot.

In yet another example, a method includes storing data indicating an association between an optical identifier and a first robot, sending, to the first robot, data encoding the optical identifier for display by the first robot, and after sending the data encoding the optical identifier, sending, to a second robot, the data indicating the association between the optical identifier and the first robot.

In yet another example, a control system includes means for storing data indicating an association between an optical identifier and a first robot, means for sending, to the first robot, data encoding the optical identifier for display by the first robot, and means for after sending the data encoding the optical identifier, sending, to a second robot, the data indicating the association between the optical identifier and the first robot.

In yet another example, a robot includes one or more processors, an optical communication interface, and a computer-readable storage medium storing instructions that, when executed by the one or more processors, cause the robot to perform functions. The functions include receiving data encoding a first optical identifier of the robot, displaying, by the optical communication interface, the first optical identifier, receiving data encoding a second optical identifier of the robot, and displaying, by the optical communication interface, the second optical identifier.

In yet another example, a computer-readable storage medium stores instructions that, when executed by a robot comprising an optical communication interface, cause the robot to perform functions. The functions include receiving data encoding a first optical identifier of the robot, displaying, by the optical communication interface, the first optical identifier, receiving data encoding a second optical identifier of the robot, and displaying, by the optical communication interface, the second optical identifier.

In yet another example, a method performed by a robot comprising an optical communication interface includes receiving data encoding a first optical identifier of the robot, displaying, by the optical communication interface, the first optical identifier, receiving data encoding a second optical identifier of the robot, and displaying, by the optical communication interface, the second optical identifier.

In yet another example, a robot includes means for receiving data encoding a first optical identifier of the robot, means for displaying the first optical identifier, means for receiving data encoding a second optical identifier of the robot, and means for displaying the second optical identifier.

In yet another example, a first robot includes one or more processors and a computer-readable storage medium storing instructions that, when executed by the one or more processors, cause the first robot to perform functions. The functions include receiving, from a control system, data encoding a first priority status of the first robot and capturing an image of an indication of a second priority status of a second robot. The indication is displayed by the second robot. The functions further include determining the second priority status by identifying the indication within the captured image, comparing the first priority status to the second priority status, and performing an action based on comparing the first priority status to the second priority status.

In yet another example, a computer-readable medium stores instructions that, when executed by a first robot, cause the first robot to perform functions. The functions include receiving, from a control system, data encoding a first priority status of the first robot and capturing an image of an indication of a second priority status of a second robot. The indication is displayed by the second robot. The functions further include determining the second priority status by identifying the indication within the captured image, comparing the first priority status to the second priority status, and performing an action based on comparing the first priority status to the second priority status.

In yet another example, a method performed by a first robot includes receiving, from a control system, data encoding a first priority status of the first robot and capturing an image of an indication of a second priority status of a second robot. The indication is displayed by the second robot. The method further includes determining the second priority status by identifying the indication within the captured image, comparing the first priority status to the second priority status, and performing an action based on comparing the first priority status to the second priority status.

In yet another example, a first robot includes means for receiving, from a control system, data encoding a first priority status of the first robot and means for capturing an image of an indication of a second priority status of a second robot. The indication is displayed by the second robot. The first robot further includes means for determining the second priority status by identifying the indication within the captured image, means for comparing the first priority status to the second priority status, and means for performing an action based on comparing the first priority status to the second priority status.

These as well as other aspects, advantages, and alternatives, will become apparent to those of ordinary skill in the art by reading the following detailed description, with reference where appropriate to the accompanying figures.

DETAILED DESCRIPTION

Figure 1A:
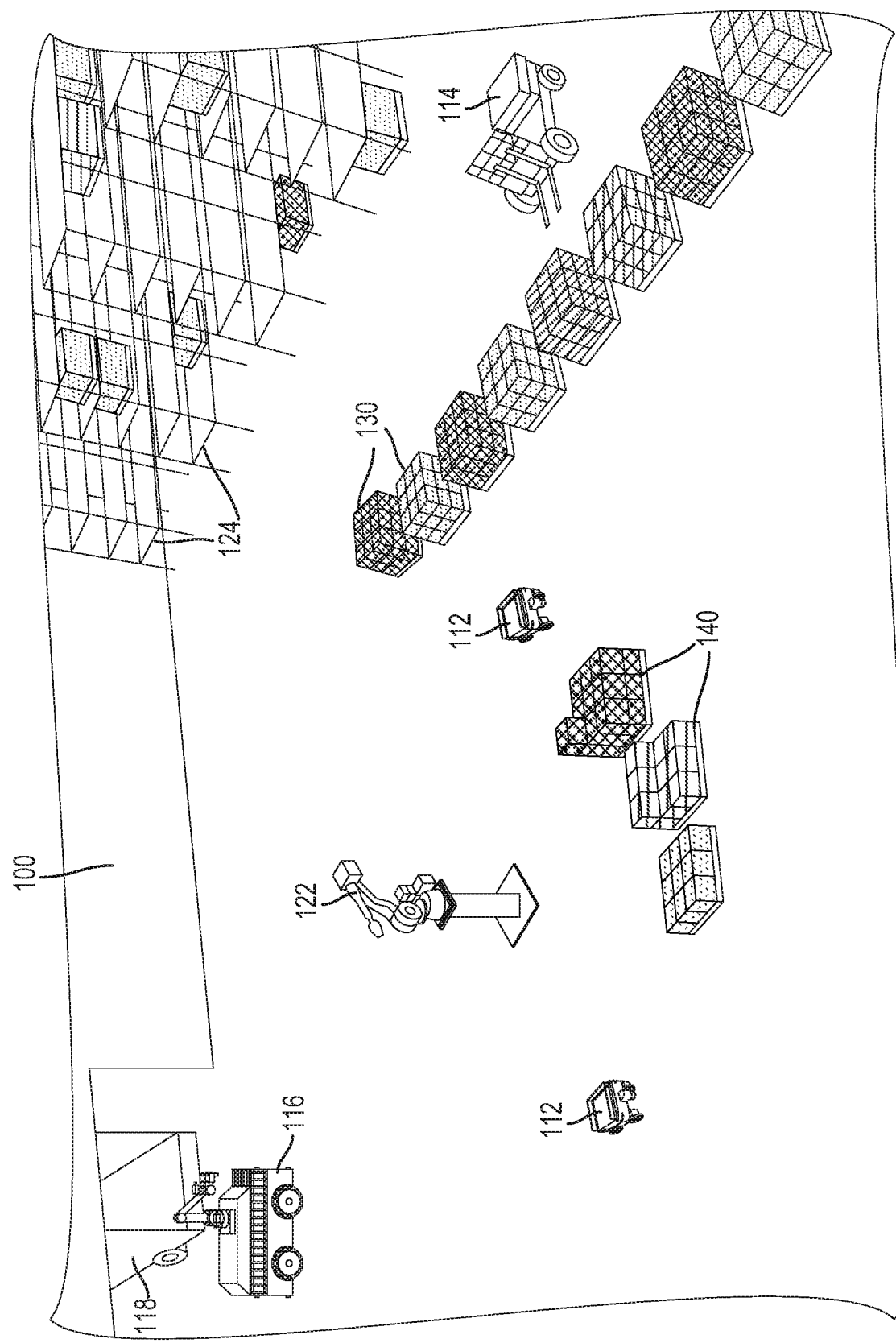
FIG. 1A shows a robotic fleet, according to an example embodiment.

Example methods and systems are described herein. Any example implementation or feature described herein is not necessarily to be construed as preferred or advantageous over other implementations or features. The example implementations described herein are not meant to be limiting. Certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or fewer of each element shown in a given Figure. Further, some of the illustrated elements may be combined or omitted. Yet further, an example embodiment may include elements that are not illustrated in the Figures.

Multiple robots may act in coordination to perform a variety of tasks, perhaps at the direction of a control system. In one such example, the control system may coordinate the robots as the robots move items within a warehouse. In this context, the control system may monitor and identify various robots within the warehouse to observe and aid in tasks being performed by the robots. One way for the control system to identify a given robot in the warehouse might be to use a camera or another optical sensor to detect and identify a "static" identifier (e.g., a two-dimensional matrix code) that appears on the exterior of the given robot. However, static identifiers can be vulnerable to "spoofing." For example, a malicious party may deploy within the warehouse an imposter robot marked with another robot's identifier. The malicious party may then use the imposter robot to disrupt or hijack the operations of the other robots by "tricking" the other robots into acting in coordination with the imposter robot.

To address this problem, the robots and/or the control system may use "dynamic" optical identifiers that are reassigned to respective robots periodically or upon detection of various events. For example, the control system may send to a first robot, data encoding an optical identifier of the first robot. The optical identifier may include any sort of fiducial marker, such as a shape, pattern, marking, or two-dimensional matrix code recognizable as corresponding to the first robot. The optical identifier may be displayed on a display screen of the first robot. In another example, the first robot may use a light source such as a light-emitting diode (LED) to display a series of flashing visible or infrared pulses as the optical identifier. Thereafter, the control system may periodically, or upon identification of a potential security breach of the warehouse, send to the first robot new data encoding a new optical identifier of the first robot. The first robot may then display the new optical identifier for detection by other robots or the control system.

The control system may maintain a database of optical identifiers respectively assigned to various robots in the warehouse. Such a database may be accessible by any or all of the robots in the warehouse. The control system may detect the first robot's optical identifier and access the database to associate the detected optical identifier with the first robot. The control system may then observe the first robot to determine a state of the first robot, including one or more of a current location of the first robot, the identity of an item or another robot that the first robot is interacting with, or an operational status etc. Based on the state of the first robot and in accordance with overall system goals, the control system may send a command to the first robot to perform a particular function.

In another example, a second robot may detect the first robot's optical identifier and send a request to the control system for information identifying the first robot. Such a request may include data encoding the optical identifier that is displayed by the first robot and detected by the second robot. In reply, the control system may send to the second robot a network address of the first robot. In some examples, the second robot may send a message or a command to the network address of the first robot. Such a message or command may cause the first robot to perform functions that further the overall system goals.

In addition to identifying the first robot, the optical identifier of the first robot may indicate a priority status of the first robot. For example, the first robot may be tasked with bringing a first item to a third robot and the second robot may be tasked with bringing a second item to the third robot. If both the first and second robots approach the third robot at about the same time, the first and second robots may need to determine which of the first and second robots will bring their respective item to the third robot first. For example, the optical identifier of the first robot may indicate a priority status "1" whereas the optical identifier of the second robot may indicate a priority status "2." In this case, the first robot may detect the optical identifier of the second robot, determine that the priority status of the first robot is higher than the priority status of the second robot, and proceed to bring the first item to the third robot without yielding to the second robot. Similarly, the second robot may detect the optical identifier of the first robot, determine that the priority status of the first robot is higher than the priority status of the second robot, and proceed to bring the second item to the third robot only after determining that the first robot has departed the vicinity of the third robot.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example embodiments, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various embodiments, automating the process of loading/unloading delivery trucks at the warehouse and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls or floors. In additional embodiments, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Referring now to the figures, FIG. 1A depicts a robotic fleet within a warehouse setting, according to an example embodiment. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

The robotic fleet 100 may include various types of mobile vehicles. One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as optical sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Various types of robotic devices other than those illustrated here may be included in an example system. In some examples, one or more robotic devices may use alternative modes of locomotion instead of wheel-based locomotion. For instance, one or more robotic devices may be rotor-driven so as to operate airborne. For instance, an airborne robotic device such as a quadcopter may be used for various tasks such as moving objects or collecting sensor data.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage 124 may be used to store pallets and/or objects within the warehouse. The density storage 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

Figure 1B:
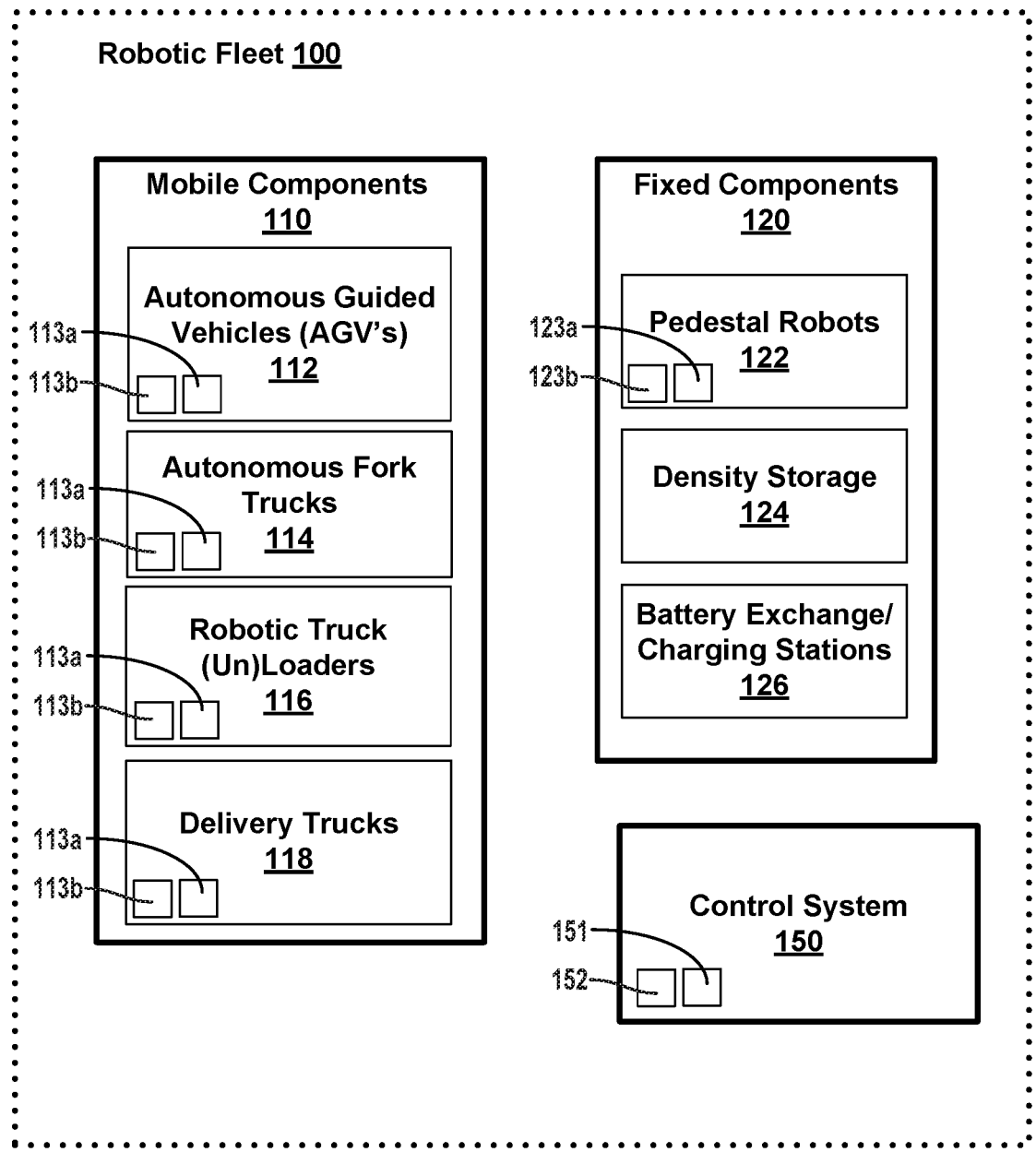
FIG. 1B is a functional block diagram illustrating components of a robotic fleet, according to an example embodiment.

FIG. 1B is a functional block diagram illustrating components of a robotic fleet 100, according to an example embodiment. The robotic fleet 100 could include one or more of various mobile components 110, such as AGV's 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a control system 150, such as a remote, cloud-based server system, may communicate (e.g., by way of wireless communication interfaces) with some or all of the system components and/or with separate local control systems of individual components.

Any of the mobile components 110 may include one or more processors 113a and a non-transitory computer-readable storage medium 113b that stores instructions executable by the one or more processors 113a to perform any function or action described herein. The mobile components 110 may also each include a wireless communication interface (e.g., WIFI, Bluetooth, etc.) so that the mobile components 110 may transmit data to and/or receive data from any of the other mobile components 110, the pedestal robots 122, and/or the control system 150.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

Any of the pedestal robots 122 may include one or more processors 123a and a non-transitory computer-readable storage medium 123b that stores instructions executable by the one or more processors 123a to perform any function or action described herein. The pedestal bots 122 may also each include a wireless communication interface (e.g., WIFI, Bluetooth, etc.) so that the pedestal bots 122 may transmit data to and/or receive data from the control system 150, other pedestal robots 122, and/or any of the mobile components 110.

In some examples, control system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

The control system 150 may include one or more processors 151 and a non-transitory computer-readable storage medium 152 that stores instructions executable by the one or more processors 151 for executing any function or action described herein. The control system 150 may also include a wireless communication interface (e.g., WIFI, Bluetooth, etc.) so that the control system 150 may transmit data to and/or receive data from the any of the mobile components 110 and/or the pedestal robots 122. The control system 150 may also include a camera (or be communicatively coupled to a camera) for capturing images of the environment of the control system 150.

Planning control may also be distributed across individual system components. For example, control system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, control system 150 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may maintain or have access to a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could include information about both the current configuration or placement of components within a warehouse (or across multiple warehouses) as well as information about the configuration or placement of components that is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's depleted batteries with recharged batteries, such that robots might not have to wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a central planning system. For instance, individual mobile robots may be configured to monitor their battery charge status. The robots may periodically send information to the central planning system indicating the status of their batteries. This information may then be used by the central planning system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with three or four batteries. The robotic arm at the station 126 may be configured to lift out the entire bucket of batteries and attach individual batteries to battery chargers on a shelf at the station 126. The robotic arm may then find charged batteries to replace the depleted batteries, and move those batteries back into the bucket before reinserting the bucket into the pallet jack.

In further examples, control system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

FIGS. 2A-2D illustrate several examples of robotic devices that may be included within a robotic fleet. Other robotic devices which vary in form from those illustrated here as well as other types of robotic devices may also be included.

Figure 2A:
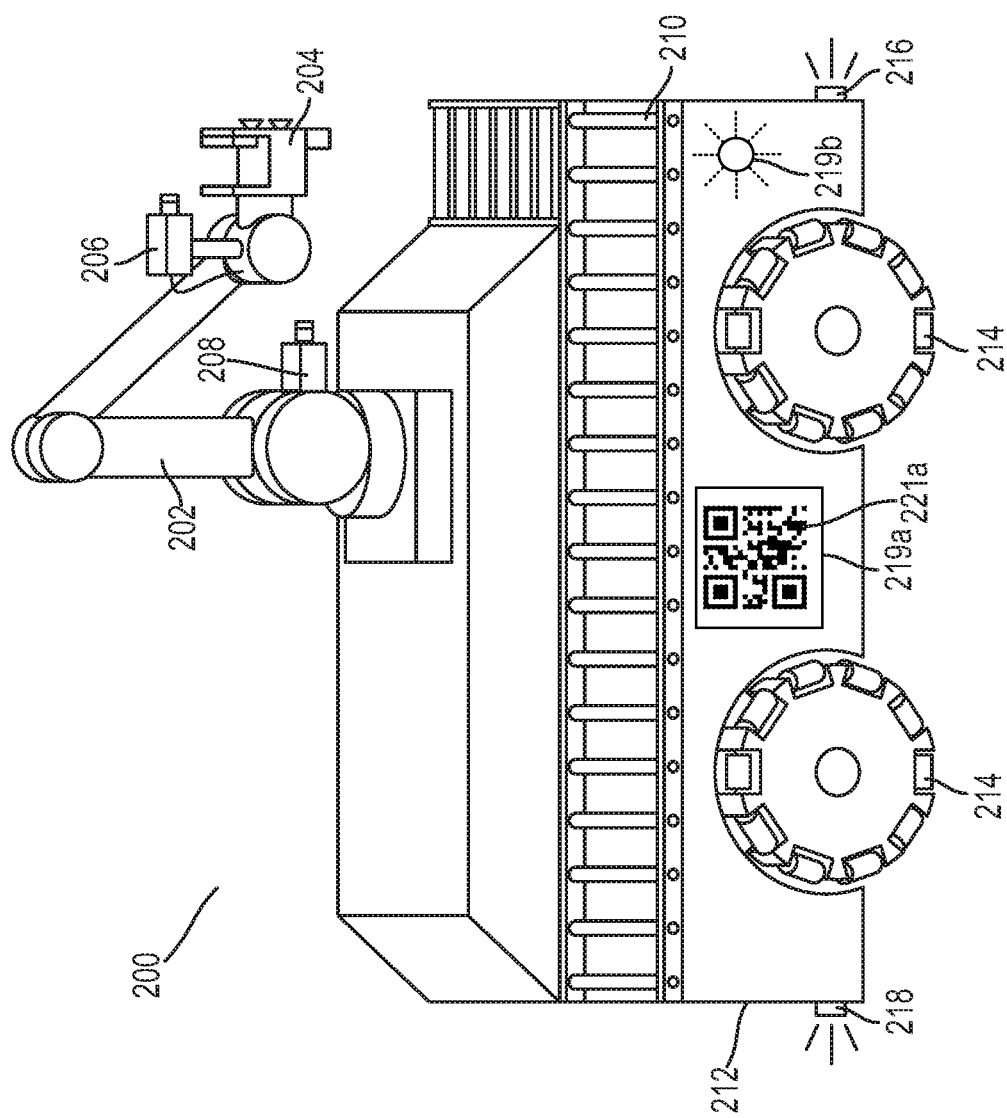
FIG. 2A shows a truck (un)loader, according to an example embodiment.

FIG. 2A illustrates a robotic truck unloader, according to an example embodiment. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 200 may include a robotic arm 202 with a gripping component 204 for gripping objects within the environment. The robotic arm 202 may use the gripping component 204 to pick up and place boxes to load or unload trucks or other containers. The truck unloader 200 may also include a moveable cart 212 with wheels 214 for locomotion. The wheels 214 may be holonomic wheels that allow the cart 212 to move with two degrees of freedom. Additionally, a wrap-around front conveyor belt 210 may be included on the holonomic cart 212. In some examples, the wrap around front conveyer belt may allow the truck loader 200 to unload or load boxes from or to a truck container or pallet without having to rotate gripper 204.

In further examples, a sensing system of robotic truck unloader 200 may use one or more sensors attached to a robotic arm 202, such as sensor 206 and sensor 208, which may be 2D sensors and/or 3D depth sensors that sense information about the environment as the robotic arm 202 moves. The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a front navigation sensor 216 and a rear navigation sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system may cause the mobile base to navigate into a position for unloading or loading. In some examples, the sensor 208 may include a camera configured to capture images of the environment of the truck unloader 200 (including other robots).

In further examples, the robotic arm 202 may be equipped with a gripper 204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 200 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

The truck unloader 200 may include an optical communication interface, such as a display screen 219*a* and/or a light source 219*b*. In some embodiments, the truck unloader 200 might only include one version of the optical communication interface, that is, either the display screen 219*a* or the light source 219*b*. The truck unloader 200 may use its wireless communication interface (not shown) to receive, from the control system 150, data for display by the optical communication interface. In some embodiments, the truck unloader 200 may include multiple optical communication interfaces respectively located on various sides of the truck unloader 200 so that the information displayed may be detected or viewed from several angles.

The display screen 219*a* may include a liquid crystal display (LCD), a plasma display, or a light emitting diode (LED) display, but other examples are possible.

The light source 219*b* may include an incandescent light bulb, an LED, or any other light source configured to generate pulses of visible or infrared light.

Figure 2B:
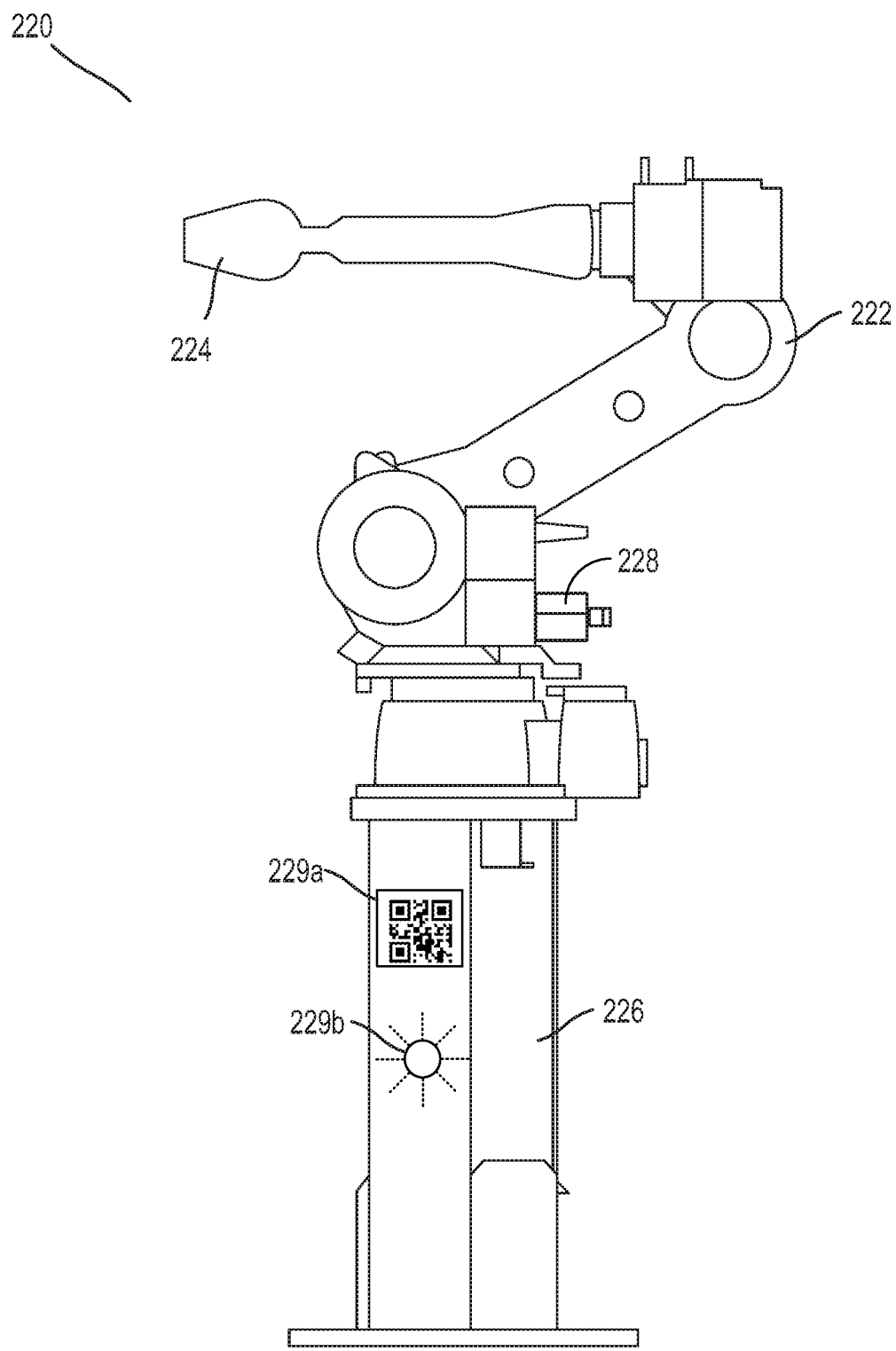
FIG. 2B shows a pedestal robot, according to an example embodiment.

FIG. 2B illustrates a robotic arm on a pedestal, according to an example embodiment. More specifically, pedestal robot 220 may be positioned within an environment such as a warehouse environment and used to pick up, move, and/or otherwise manipulate objects within reach. In some examples, the pedestal robot 220 may be specialized for heavy lifting without requiring batteries to operate. The pedestal robot 220 may include a robotic arm 222 with an end-effector-mounted gripper 224, which may be of the same type as the robotic manipulator 202 and gripper 204 described with respect to the robotic truck unloader 200. The robotic arm 222 may be mounted on a pedestal 226, which may allow the robotic arm 222 to easily pick up and move nearby packages, such as to distribute packages between different mobile robots. In some examples, the robotic arm 222 may also be operable to construct and/or deconstruct pallets of boxes. In further examples, the pedestal 226 may include an actuator to allow a control system to change the height of the robotic arm 222.

In further examples, a bottom surface of the pedestal robot 220 may be a pallet-shaped structure. For instance, the bottom surface may have dimension and shape roughly equivalent to other pallets used for object transport or storage within a warehouse. By shaping the bottom of the pedestal robot 220 as a pallet, the pedestal robot 220 may be picked up and moved to different locations within a warehouse environment by a pallet jack or different type of autonomous fork truck. For instance, when a delivery truck arrives at a particular docking port of the warehouse, a pedestal robot 220 may be picked up and moved to a location closer to the delivery truck to more efficiently process boxes coming from or going to the delivery truck.

In additional examples, the pedestal robot 220 may also include one or more visual sensors to identify boxes and/or other robotic devices within the vicinity of the pedestal robot 220. For instance, a control system of the pedestal robot 220 or a control system may use sensor data from sensors on the pedestal robot 220 to identify boxes for the robotic arm 222 and gripper 224 of the pedestal robot 220 to pick up or manipulate. In further examples, the sensor data may also be used to identify mobile robotic devices in order to determine where to distribute individual boxes. Other types of robotic fixed manipulation stations may also be used within a heterogeneous robotic fleet as well.

The pedestal robot 220 may include an optical communication interface, such as a display screen 229a and/or a light source 229b. In some embodiments, pedestal robot 220 might only include one version of the optical communication interface, that is, either the display screen 229a or the light source 229b. The pedestal robot 220 may use its wireless communication interface (not shown) to receive, from the control system 150, data for display by the optical communication interface. In some embodiments, the pedestal robot 220 may include multiple optical communication interfaces respectively located on various sides of the pedestal robot 220 so that the information displayed may be detected or viewed from several angles.

The display screen 229a may include a liquid crystal display (LCD), a plasma display, or a light emitting diode (LED) display, but other examples are possible.

The light source 229b may include an incandescent light bulb, an LED, or any other light source configured to generate pulses of visible or infrared light.

In some examples, the pedestal robot 220 may include a camera 228 configured to capture images of the environment of the pedestal robot 220 (including other robots).

Figure 2C:
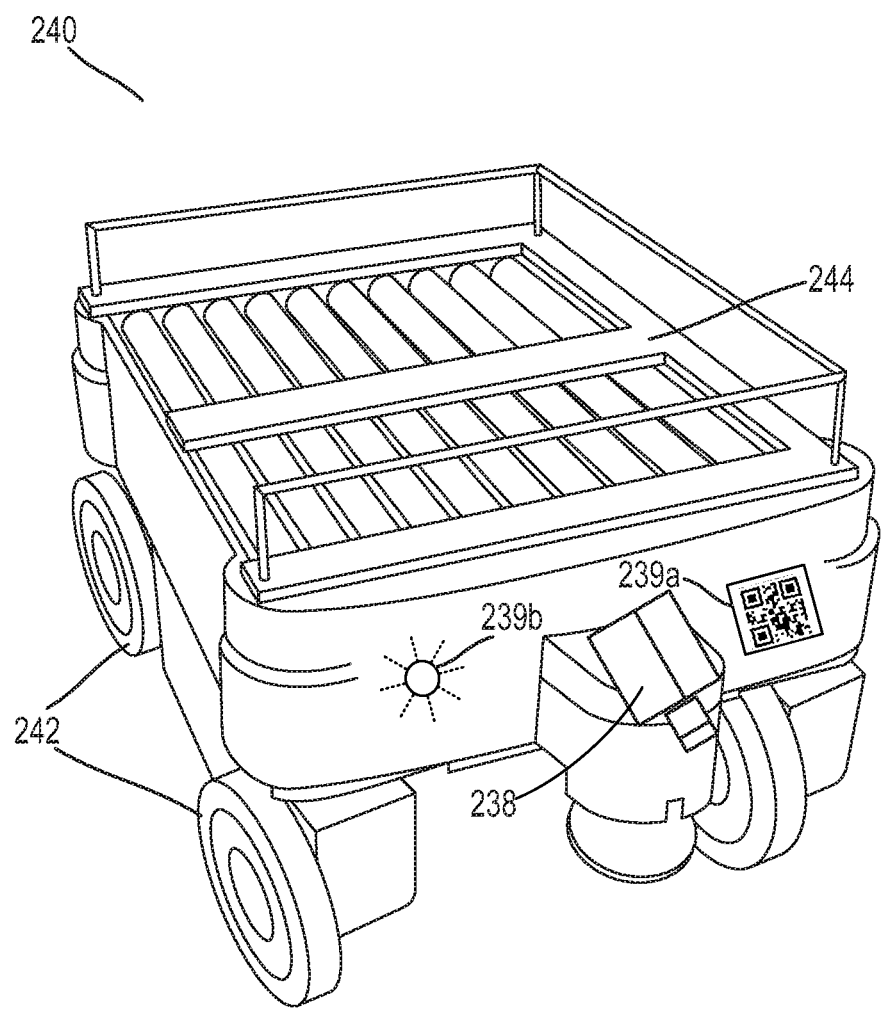
FIG. 2C shows an autonomous guided vehicle, according to an example embodiment.

FIG. 2C shows an autonomous guided vehicle (AGV), according to an example embodiment. More specifically, AGV 240 may be a relatively small, mobile robotic device that is capable of transporting individual boxes or cases. The AGV 240 may include wheels 242 to allow for locomotion within a warehouse environment. Additionally, a top surface 244 of the AGV 240 may be used to place boxes or other objects for transport. In some examples, the top surface 244 may include rotating conveyors to move objects to or from the AGV 240. In additional examples, the AGV 240 may be powered by one or more batteries that can be quickly recharged at a battery charging station and/or exchanged for fresh batteries at a battery exchange station. In further examples, the AGV 240 may additionally include other components not specifically identified here, such as sensors for navigation. AGVs with different shapes and sizes also may be included within a robotic fleet, possibly depending on the types of packages handled by a warehouse.

The AGV 240 may include an optical communication interface, such as a display screen 239a and/or a light source 239b. In some embodiments, AGV 240 might only include one version of the optical communication interface, that is, either the display screen 239a or the light source 239b. The AGV 240 may use its wireless communication interface (not shown) to receive, from the control system 150, data for display by the optical communication interface. In some embodiments, the AGV 240 may include multiple optical communication interfaces respectively located on various sides of the AGV 240 so that the information displayed may be detected or viewed from several angles.

The display screen 239a may include a liquid crystal display (LCD), a plasma display, or a light emitting diode (LED) display, but other examples are possible.

The light source 239b may include an incandescent light bulb, an LED, or any other light source configured to generate pulses of visible or infrared light.

In some examples, the AGV 240 may include a camera 238 configured to capture images of the environment of the AGV 240 (including other robots).

Figure 2D:
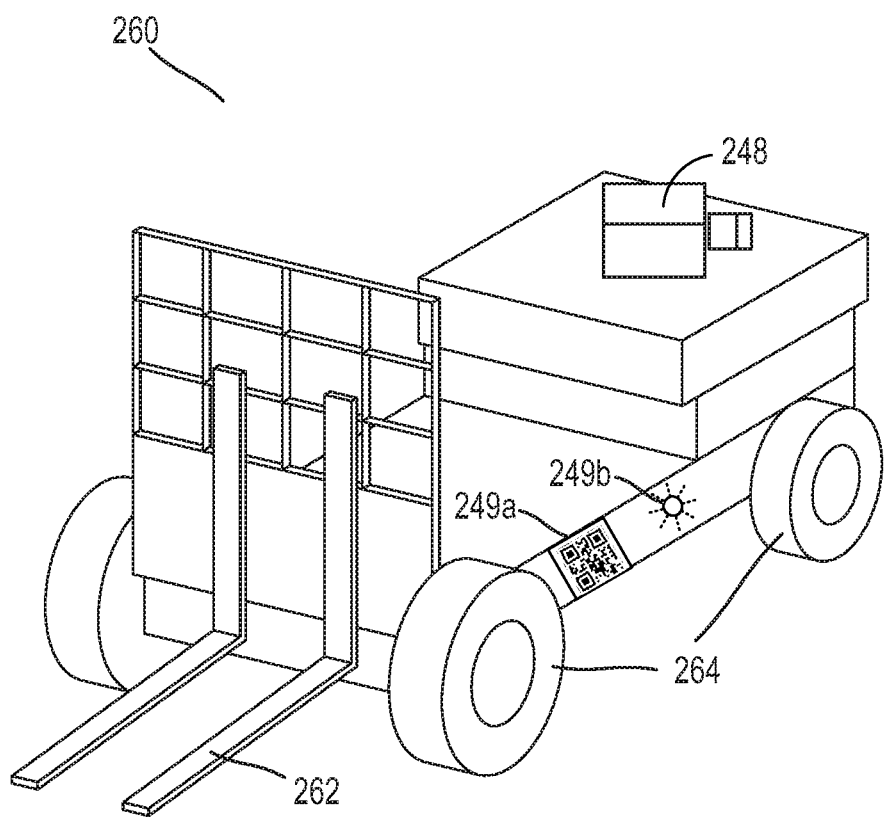
FIG. 2D shows an autonomous fork truck, according to an example embodiment.

FIG. 2D shows an autonomous fork truck, according to an example embodiment. More specifically, autonomous fork truck 260 may include a forklift 262 for lifting and/or moving pallets of boxes or other larger materials. In some examples, the forklift 262 may be elevated to reach different racks of a storage rack or other fixed storage structure within a warehouse. The autonomous fork truck 260 may additionally include wheels 264 for locomotion to transport pallets within the warehouse. In additional examples, the autonomous fork truck may include a motor and power supply as well as a sensing system, such as those described with respect to robotic truck unloader 200. The autonomous fork truck 260 may also vary in size or shape from the one illustrated in FIG. 2D.

The autonomous fork truck 260 may include an optical communication interface, such as a display screen 249a and/or a light source 249b. In some embodiments, autonomous fork truck 260 might only include one version of the optical communication interface, that is, either the display screen 249a or the light source 249b. The autonomous fork truck 260 may use its wireless communication interface (not shown) to receive, from the control system 150, data for display by the optical communication interface. In some embodiments, the autonomous fork truck 260 may include multiple optical communication interfaces respectively located on various sides of the autonomous fork truck 260 so that the information displayed may be detected or viewed from several angles.

The display screen 249a may include a liquid crystal display (LCD), a plasma display, or a light emitting diode (LED) display, but other examples are possible.

The light source 249b may include an incandescent light bulb, an LED, or any other light source configured to generate pulses of visible or infrared light.

In some examples, the autonomous fork truck 260 may include a camera 248 configured to capture images of the environment of the autonomous fork truck 260 (including other robots).

FIGS. 3A, 3B, 3C, 3D, and 3E collectively illustrate example operations of a robotic fleet in a warehouse, according to an example embodiment. More specifically, a robotic fleet containing different types of robots with different types of assigned tasks may be deployed within warehouse 300. Different robotic devices may operate independently at the same time according to instructions from a centralized control system or hive mind to complete jobs, such as receiving objects, storing objects, retrieving objects from storage, transporting objects, delivering objects from the warehouse, or otherwise processing objects. Additionally, in some examples, two or more robotic devices may collaborate to perform jobs together, possibly leveraging specialized equipment or functionality of particular devices.

Figure 3A:
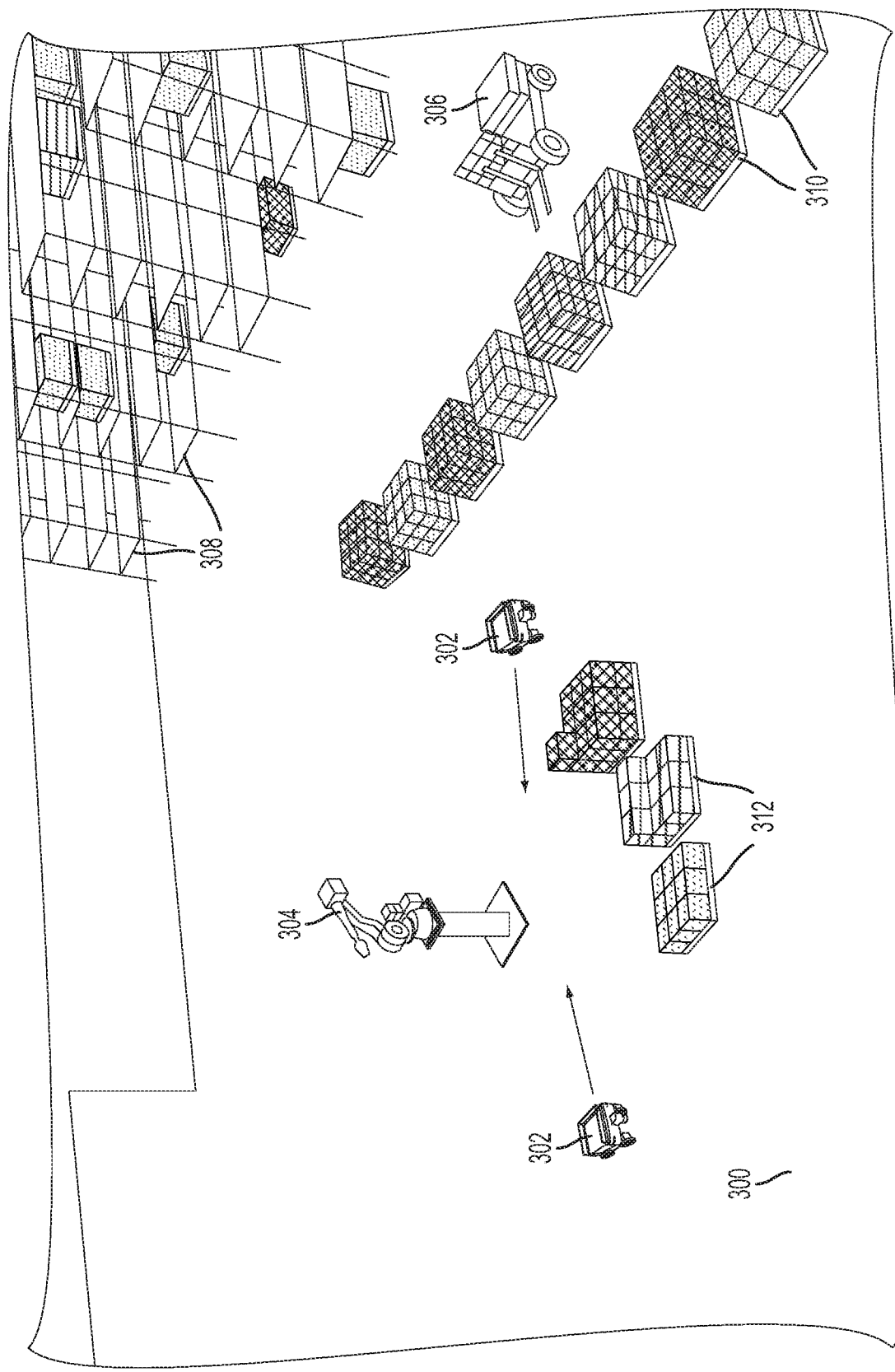
FIGS. 3A, 3B, 3C, 3D, and 3E illustrate example operations of a robotic fleet in a warehouse, according to an example embodiment.

In reference to FIG. 3A, a robotic fleet may include multiple AGV's 302 for quickly transporting small totes, such as individual boxes or objects. The AGV's 302 may be assigned by the centralized control system to move to particular areas of warehouse 300 to pick up boxes for transport to another location, such as to store a box or to move a box to a location to await delivery from the warehouse 300. In some examples, the AGV's 302 may be assigned to move within an area of reach of a fixed robotic manipulator, such as pedestal robot 304. More specifically, pedestal robot 304 may be a robotic arm that is configured to pick up or otherwise move nearby objects. In some examples, the pedestal robot 304 may be capable of constructing or deconstructing nearby pallets 312 of boxes. In additional examples, the pedestal robot 304 may be operable to remove objects from or place particular objects on the AGV's 302 once the AGV's have moved within an area of reach of the pedestal robot 304.

In further examples, different types of fixed robotic manipulation stations may be positioned within warehouse 300 as well or instead. For instance, instead of using a robotic arm with a gripper, a different type of robotic manipulator may be used, possibly depending on the types of objects stored within warehouse 300, or types of actions needed to processes those objects. In some examples, a fixed robotic manipulator may be configured to open boxes to manipulate items within the boxes as well. For instance, a warehouse may include a case containing a number of copies of a consumer product. A robotic manipulator may be capable of placing individual copies of the product into smaller boxes (possibly transported by AGVs) for shipment out of the warehouse.

The robotic fleet may additionally contain other types of mobile robotic devices for transport of different types or sizes of totes. For example, an autonomous fork truck 306 may be used to pick up and transport pallets, flat support structures upon which boxes may be stacked. In some examples, storage racks 308 within warehouse 300 may be used to store pallets of boxes, possibly pallets that are transported to and/or from the racks by autonomous fork truck 306. In additional examples, certain pallets 300 may be placed at particular locations within the warehouse 300 to await further processing. For instance, one of the pallets 300 may be left at a chosen location until a mobile robot is free to move the pallet, until a pedestal robot 304 is free to manipulate boxes on the pallet, or until a delivery truck arrives at the warehouse to transport the pallet to another location outside the warehouse.

Figure 3B:
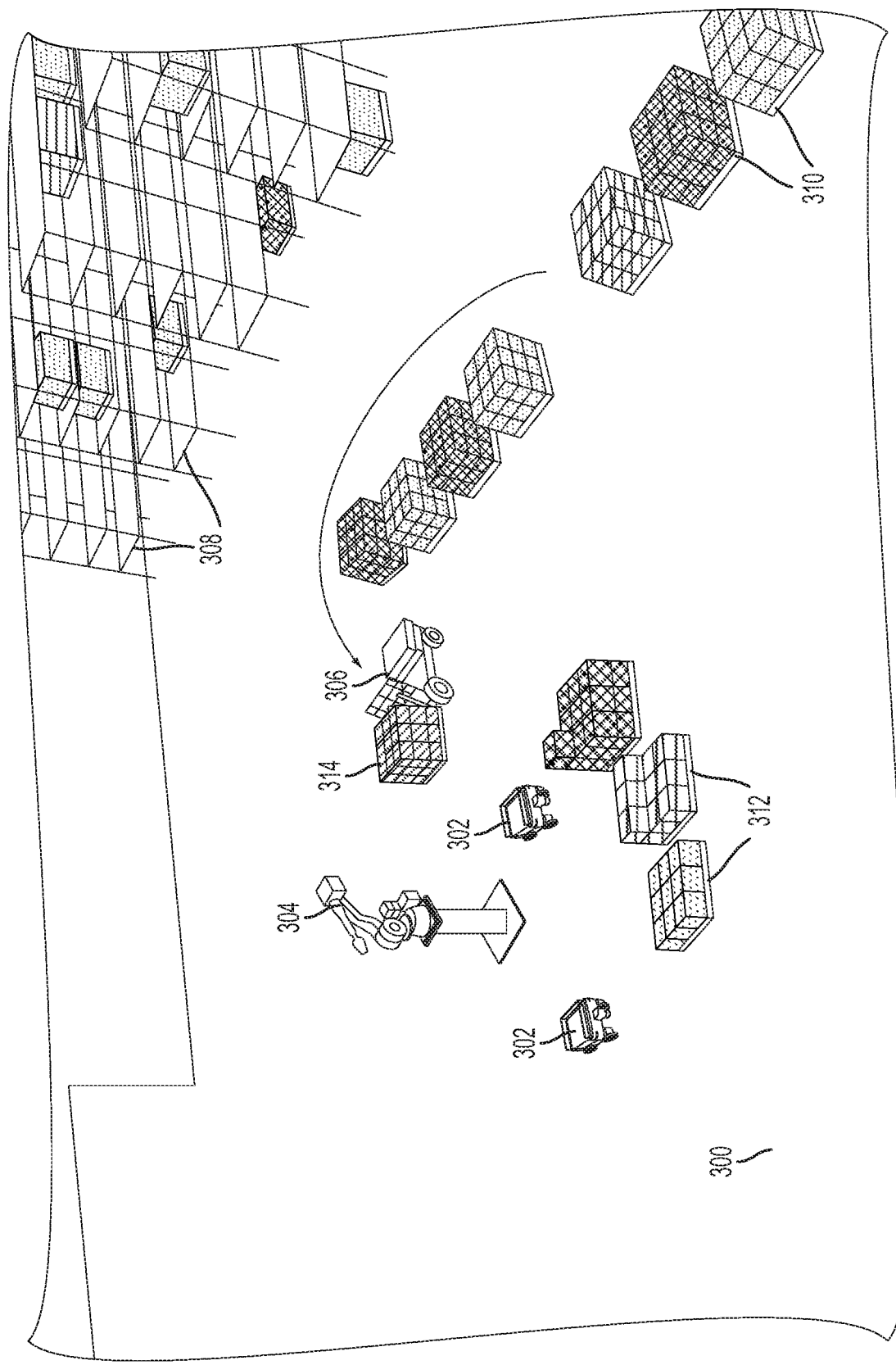

In reference to FIG. 3B, autonomous fork truck 306 may be assigned to transport a particular pallet 314 of boxes to an area within reach of pedestal robot 304. For instance, the pallet 314 may contain boxes of a particular type. By transporting the pallet 314 to a location where the pedestal robot 304 can reach it, the pedestal robot 304 may then redistribute objects from pallet 314 to other areas within reach, such as onto other pallets 312 or onto one of the nearby AGVs 302 for transport to other locations.

In some examples, the autonomous fork truck 306 may move to an area within reach of the pedestal robot 304 and may then drop off the pallet 314 on the ground at a point where the pedestal robot 304 can reach some or all of the objects on the pallet 314. In further examples, after dropping off the pallet 314, the autonomous fork truck 306 may then leave the area to perform a different task, such as to retrieve another pallet from storage racks 308 or from pallets 310 currently stored on the ground within warehouse 300. In other examples, the autonomous fork truck 306 may pick up and move a different pallet 312 within reach of 304 after dropping off pallet 314, which may be a pallet that was partially or fully constructed by pedestal robot 304.

Figure 3C:
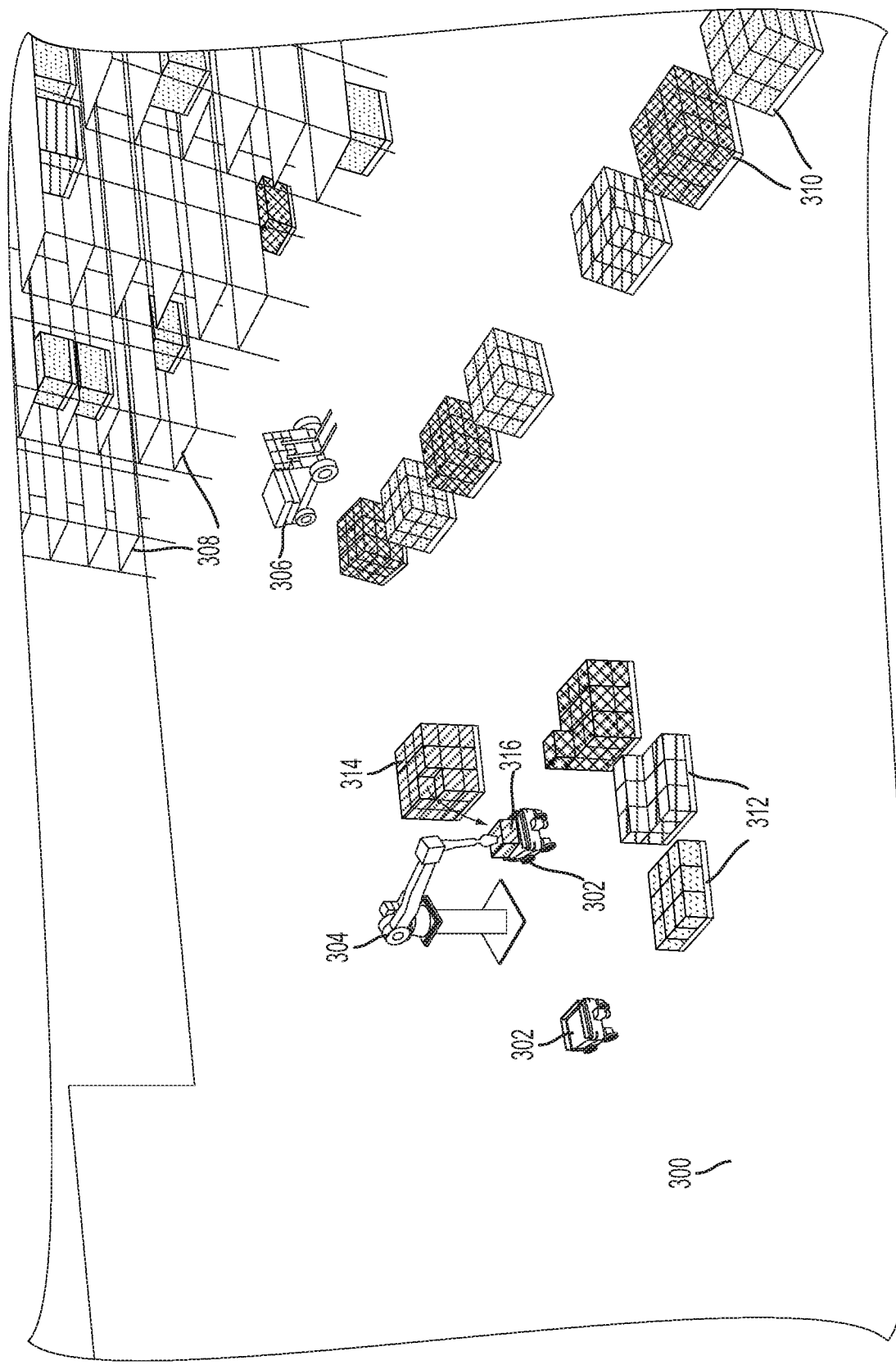

In reference to FIG. 3C, pedestal robot 304 may be assigned to transfer a box 316 from pallet 314 to AGV 302. Such a process may be repeated for other boxes in pallet 314, perhaps until the boxes of pallet 314 have been fully de-palletized. Autonomous fork truck 306 may move back to its previous position near other pallets, as shown.

Figure 3D:
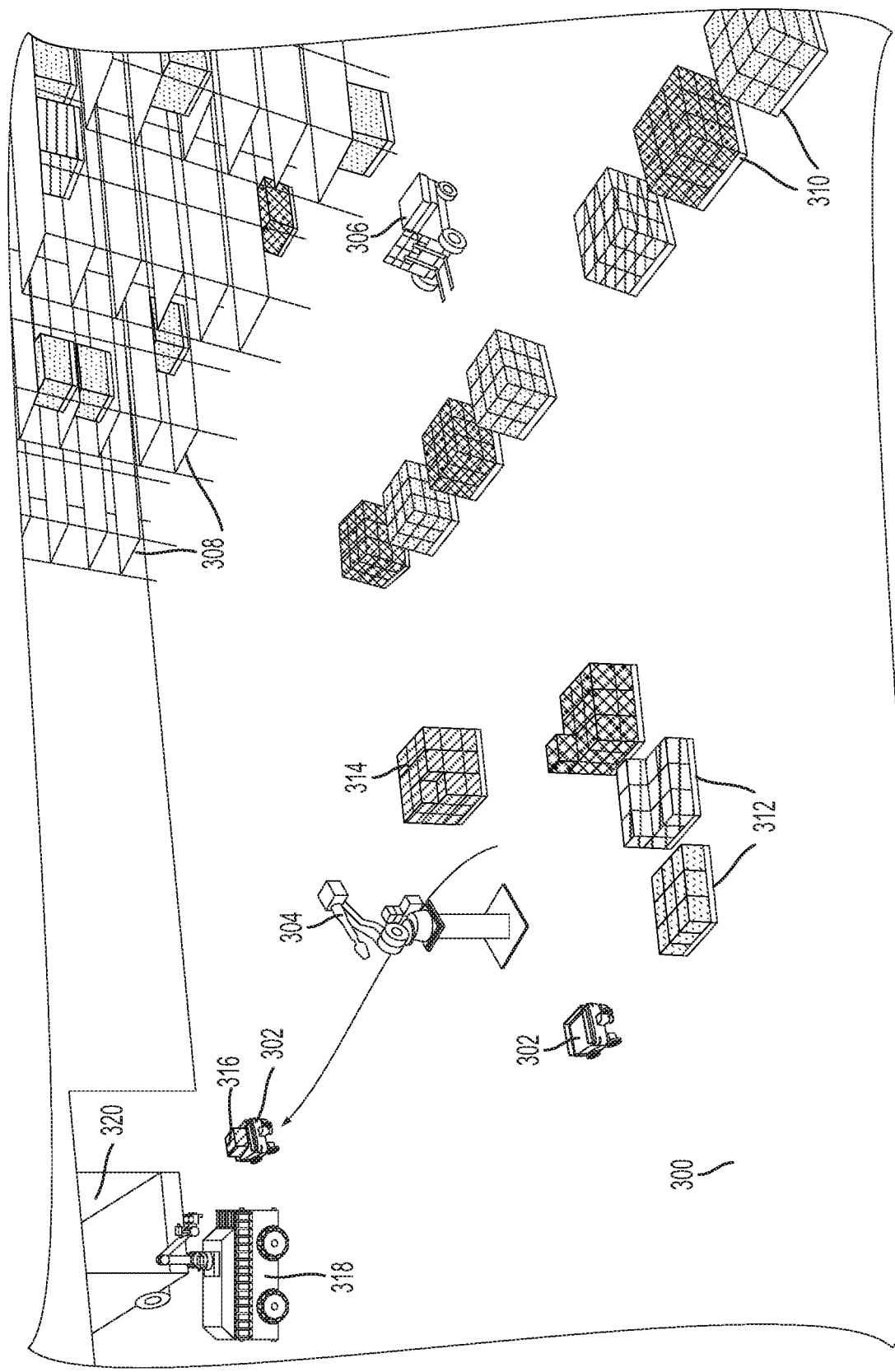
Figure 3E:
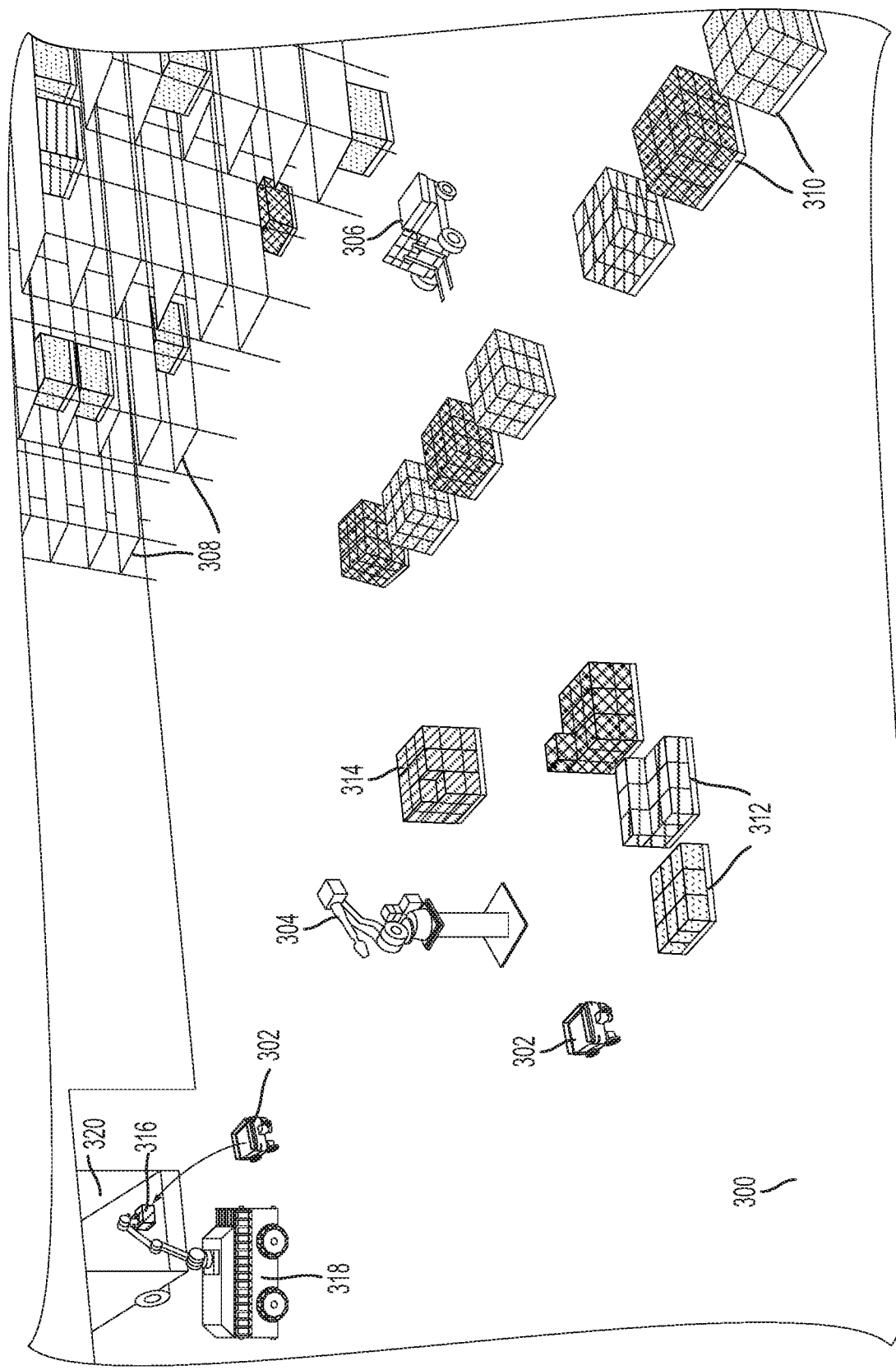

In reference to FIG. 3D, AGV 302 may be assigned to move to an area in proximity to truck 320, thereby transporting box 316 from a location near the pedestal robot 304 to a location near truck unloader 318. Then, in reference to FIG. 3E, truck unloader 318 may transfer box 316 from AGV 302 to truck 320.

Figure 2E:
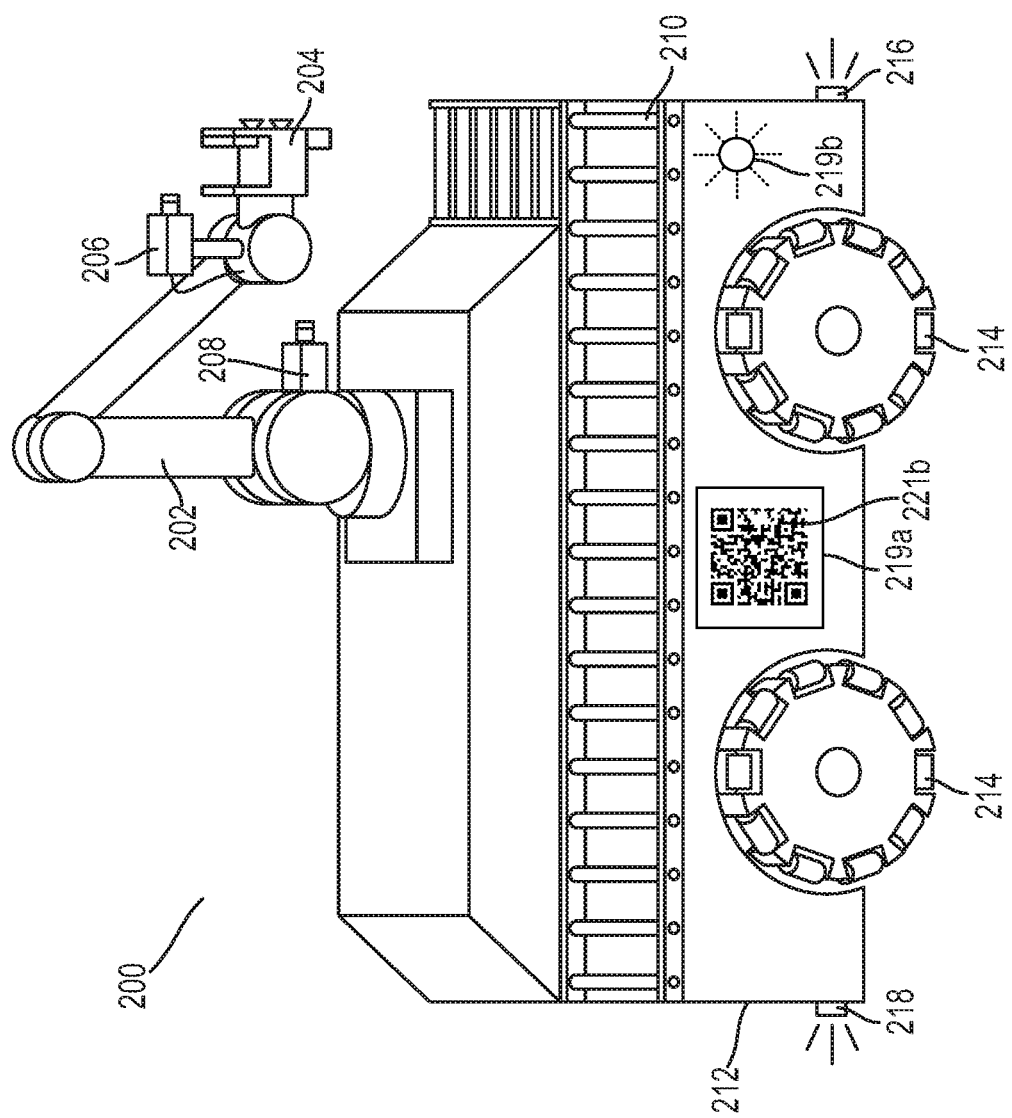
FIG. 2E shows a truck (un)loader, according to an example embodiment.
Figure 4:
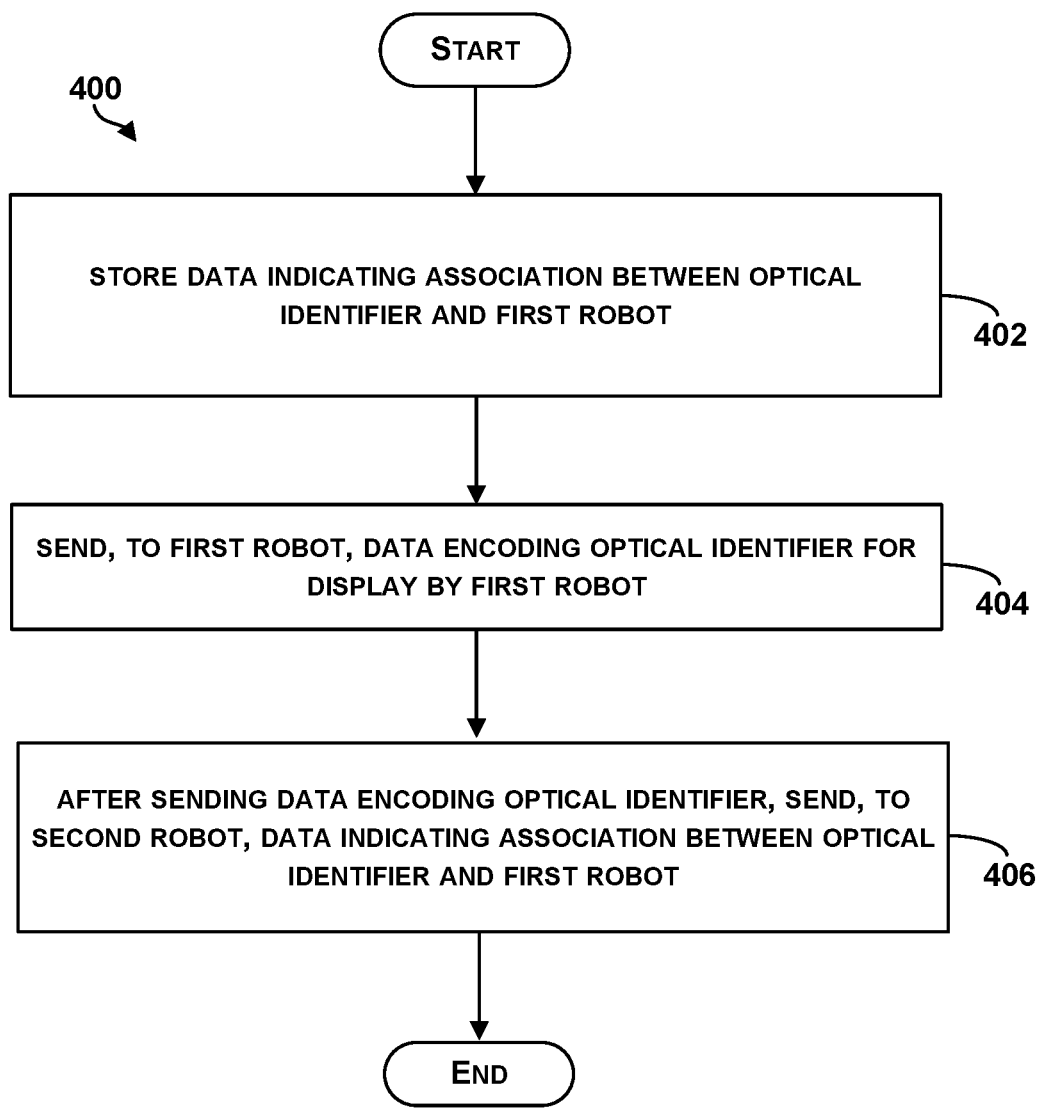
FIG. 4 is a block diagram of a method, according to an example embodiment.
Figure 5:
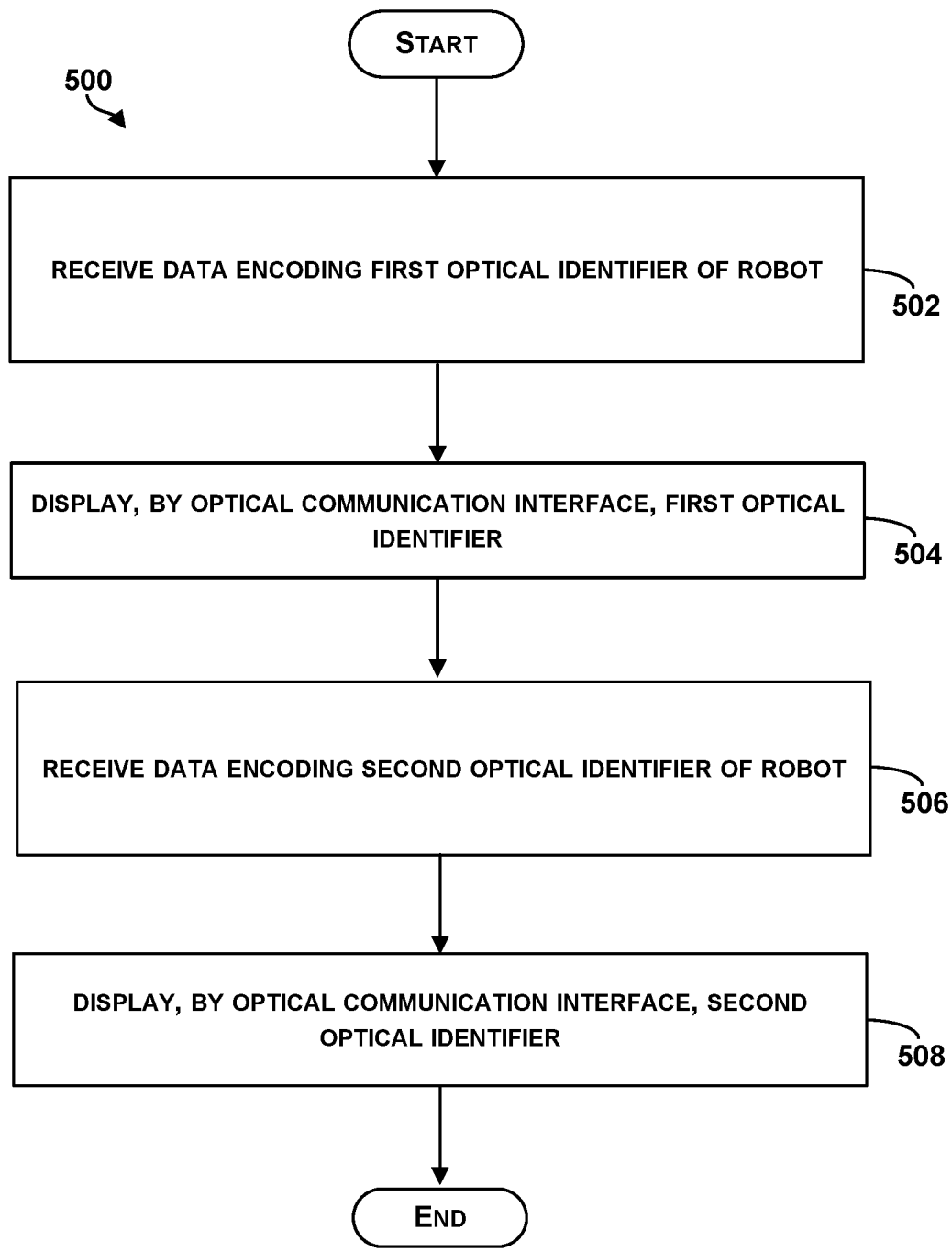
FIG. 5 is a block diagram of another method, according to an example embodiment.
Figure 6:
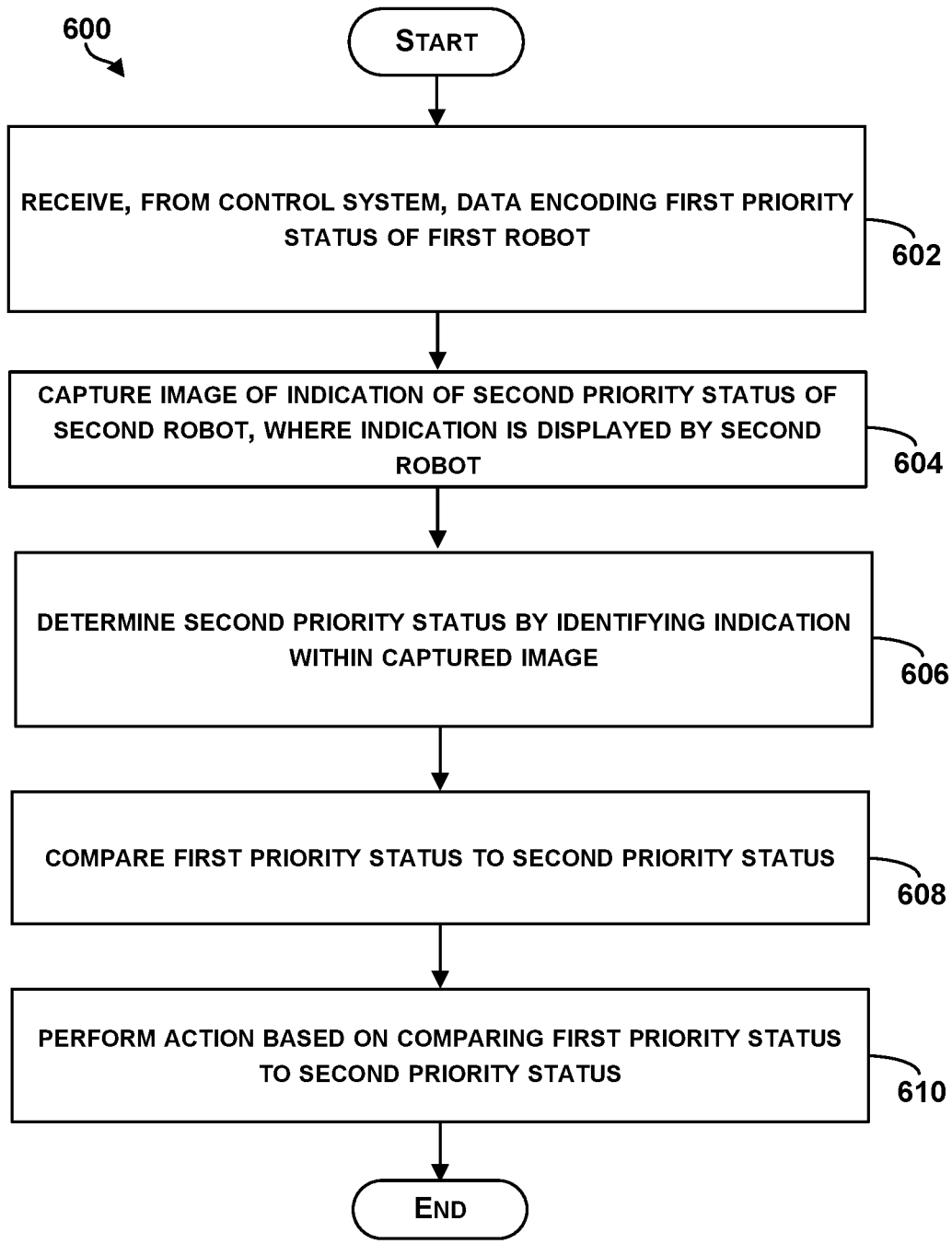
FIG. 6 is a block diagram of yet another method, according to an example embodiment.

Methods 400, 500, and 600 respectively shown in FIG. 4, FIG. 5, and FIG. 6 present example methods that can be performed by one or more of (i) the robotic fleet 100 in FIGS. 1A and 1B, (ii) the control system 150 of FIG. 1B, (iii) the robotic truck unloader 200 in FIGS. 2A and 2E, (iv) the pedestal robot 220 in FIG. 2B, (v) the AGV 240 in FIG. 2C, (vi) the autonomous fork truck 260 in FIG. 2D, and/or (vii) the AGVs 302, the pedestal robot 304, and the autonomous fork truck 306 in FIGS. 3A-3E. The operations may be performed by any combination of one or more suitable components described herein. FIGS. 4-6 may include one or more operations, functions, or actions as illustrated by one or more of blocks 402-406, 502-508, and 602-610. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

Referring to FIG. 4, the method 400 may generally be performed by any control system and/or in interaction with any robot. The control system 150 may perform the method 400 in interaction with any robot of the robotic fleet 100, for example.

At block 402, the method 400 includes storing data indicating an association between a first optical identifier and a first robot. For example, the control system 150 may store, perhaps within a database at non-transitory computer-readable medium 152, data indicating an association between the first optical identifier and any of the AGVs 112, autonomous fork trucks 114, truck (un)loaders 116, delivery trucks 118, or pedestal robots 122. In some cases, the data may be stored in a table so as to associate a network address of the first robot with data encoding or representing the first optical identifier. The database maintained by the control system 150 may also include data indicating associations between other robots and other optical identifiers.

In some instances, the first optical identifier may include a two-dimensional matrix code, such as a quick response (QR) code or an augmented reality tag (ARTag). An example first optical identifier 221a takes the form of a QR code in FIG. 2A. The first optical identifier 221a may be displayed by the display screen 219. In this case, the first optical identifier 221a is recognizable (e.g., with reference to the database stored by control system 150) as being associated with the truck unloader 200. The first optical identifier 221a may convey additional information about the truck unloader 200 as well. In other examples, the first optical identifier 221a may take the form of any fiducial marker recognizable as being associated with the truck unloader 200. Generally, an optical identifier may include any fiducial marker, symbol, or information that is detectable by an optical sensor such as a camera, light detector, photosensor, photodiode, charge-coupled device, photoresistor, photomultiplier, image sensor, or photodetector, for example. An optical identifier may be communicated via visible, infrared, and/or ultraviolet light, for example.

In other examples, the first optical identifier may include pulses of infrared light and/or pulses of visible light. For instance, the light source 219b may blink or flash intermittently in a manner recognizable (e.g., with reference to the database stored by control system 150) as being associated with the truck unloader 200. The first optical identifier displayed by the light source 219*b* may take the form of morse code, for example.

In various examples, the first optical identifier, regardless of form may be associated with and be displayed by any robot.

At block 404, the method 400 includes sending, to the first robot, data encoding the first optical identifier for display by the first robot. The first robot may be represented by any of the AGVs 112, autonomous fork trucks 114, truck (un) loaders 116, delivery trucks 118, or pedestal robots 122. By further example, the control system 150 may use its wireless communication interface to send, to the truck unloader 200, data encoding the first optical identifier for display by either the display screen 219*a* or the light source 219*b*. That is, the truck unloader 200 may use the data received from the control system 150 to display the first optical identifier.

At block 406, the method 400 includes, after sending the data encoding the first optical identifier, sending, to a second robot, the data indicating the association between the first optical identifier and the first robot. The second robot may be represented by any of the AGVs 112, autonomous fork trucks 114, truck (un)loaders 116, delivery trucks 118, or pedestal robots 122. By further example, after sending the data encoding the first optical identifier to the truck unloader 200, the control system 150 may use its wireless communication interface to send, to the pedestal robot 220, data indicating the association between the first optical identifier and the truck unloader 200. The pedestal robot 220 may then use this data to identify the truck unloader 200 within the environment of the pedestal robot 220 so that the pedestal robot 220 and the truck unloader 200 may collaborate to perform a task.

The method 400 may further involve receiving, from the second robot, a message that includes data encoding the first optical identifier. In this context, sending the data indicating the association between the first optical identifier and the first robot may include sending the data indicating the association between the first optical identifier and the first robot in response to receiving the message. For example, the control system 150 may receive a message from the pedestal robot 220 of FIG. 2B requesting identification of a robot associated with the first optical identifier 221*a* that has been detected in an image captured by camera 228 of the pedestal robot 220. In response, the control system 150 may send data to the pedestal robot 220 indicating the association between the first optical identifier 221*a* and the truck unloader 200.

The method 400 may further involve determining that a predetermined amount of time passed since (i) storing the data indicating the association between the first optical identifier and the first robot or (ii) sending the data encoding the first optical identifier to the first robot.

For example, the control system 150 may generate a timestamp noting the time when the control system 150 stores the data indicating the association between the first optical identifier 221*a* and the truck unloader 200. Subsequently, the control system 150 may use an internal or network-based clock to determine that the predetermined amount of time (e.g., 30 minutes) has passed since storing the data indicating the association between the first optical identifier 221*a* and the truck unloader 200.

In another example, the control system 150 may generate a timestamp noting the time when the control system 150 sends the data encoding the first optical identifier 221*a* to the truck unloader 200. Subsequently, the control system 150 may use an internal or network-based clock to determine that the predetermined amount of time (e.g., 30 minutes) has passed since sending the the data encoding the first optical identifier 221*a* to the truck unloader 200.

The method 400 may further involve, in response to determining that the predetermined amount of time passed, sending, to the first robot, data encoding a second optical identifier of the first robot for display by the first robot. For example, after the control system 150 determines that the predetermined amount of time passed, the control system 150 may send, to the truck unloader 200, data encoding a second optical identifier 221*b* for display by the truck unloader 200. As shown in FIG. 2E, the truck unloader 200 may receive the data encoding the second optical identifier 221*b* and refresh the display screen 219*a* to display the second optical identifier 221*b*. In another example, the second optical identifier may include an additional series of pulses of visible or infrared light for display by the light source 219*b*. Periodically refreshing the optical identifier displayed by various robots may enhance security of the robotic fleet 100, as further described below.

The method 400 may further involve storing data indicating an association between the second optical identifier and the first robot. For example, the control system 150 may store new data in its database that associates a network address of the truck unloader 200 with data encoding or representing the second optical identifier 221*b*.

The method 400 may further involve identifying a potential security breach. For example, the control system 150 may use its camera (or a camera communicatively coupled to the control system 150) to capture an image of an unknown robot in the warehouse. That is, there might not be a record of the unknown robot stored in the database of the control system 150. In recognizing that the unknown robot is foreign to the robotic fleet 100, the control system 150 may identify a potential security breach.

The method 400 may further involve, in response to identifying the potential security breach, sending, to the first robot, data encoding a second optical identifier of the first robot for display by the first robot. For example, the control system 150 may send, to the truck unloader 200, data encoding the second optical identifier 221*b* for display by the truck unloader 200. As shown in FIG. 2E, the truck unloader 200 may receive the data encoding the second optical identifier 221*b* and refresh the display screen 219*a* to display the second optical identifier 221*b*. In another example, the second optical identifier may include an additional series of pulses of visible or infrared light for display by the light source 219*b*. Refreshing the optical identifier displayed by various robots in response to identification of potential security breaches may prevent an unknown robot from interfering with operations of the robotic fleet 100.

The method 400 may further involve storing data indicating an association between the second optical identifier and the first robot. For example, the control system 150 may store new data in its database that associates a network address of the truck unloader 200 with data encoding or representing the second optical identifier 221*b*.

In some examples, the control system 150 may include a camera (or be communicatively coupled to a camera). In this context, the method 400 may further involve capturing, by the camera, an image of the first optical identifier displayed by the first robot. For example, the control system 150 may capture an image that includes the first optical identifier 221*a* displayed by the display screen 219*a* of the truck unloader 200.

The method 400 may further involve identifying the first robot by detecting the first optical identifier within the captured image. For example, the control system 150 may use known image processing techniques to identify the first optical identifier 221a within the image, and then identify the truck unloader 200 by using the database to associate the first optical identifier 221a with the truck unloader 200.

The method 400 may further involve determining a state of the first robot, and based on the determined state, sending a message to the first robot. For example, the control system 150 may determine that the truck unloader 200 has deviated from its predetermined course because of navigational error. In response, the control system 150 may send a message to the truck unloader 200 that includes the current location of the truck unloader 200 and/or instructions for the truck unloader 200 to navigate back to the predetermined course. In another example, the control system 150 may determine from visual inspection that the truck unloader 200 has fallen over on its side. In this instance, the message may include instructions for the truck unloader 200 to power off until another robot is available to assist the truck unloader 200. Accordingly, determining the state of the first robot (e.g., truck unloader 200) may include determining the state of the first robot based on the at least one captured image.

In some examples, the first robot may display an indication of the state of the first robot. The indication of the state of the first robot may be included as part of the first optical identifier or may be an indication that is separate and distinct from the first optical identifier. The state of the first robot may include operational conditions such as at least one of (i) an amount of energy stored by a battery of the first robot is less than a threshold amount of energy, (ii) the first robot is experiencing a mechanical failure, and (iii) the first robot is experiencing an electrical failure. Other example states of the first robot are possible. The control system 150 may store data indicating associations between various displayable indications and states of robots so that the control system 150 may determine the states of the robots based on indications displayed by the robots.

In this context, the method 400 may further involve capturing, by a camera, an image of the indication. For example, the camera of the control system 150 may capture an image that includes the first optical identifier 221a. In some examples, the first optical identifier 221a may indicate a state of the truck unloader 200 as well as identify the truck unloader 200. In other examples, the truck unloader 200 may display an indication of the state of the truck unloader 200 that is separate and distinct from the first optical identifier 221a and the camera of the control system 150 may capture the separate and distinct indication.

The method 400 may further include identifying the indication within the captured image. For instance, the control system 150 may use known image processing techniques to identify the first optical identifier 221a (or an additional displayed indication) within the captured image. In this context, determining the state of the first robot (e.g., truck unloader 200) may include determining the state of the first robot based on the identified indication.

Figure 7:
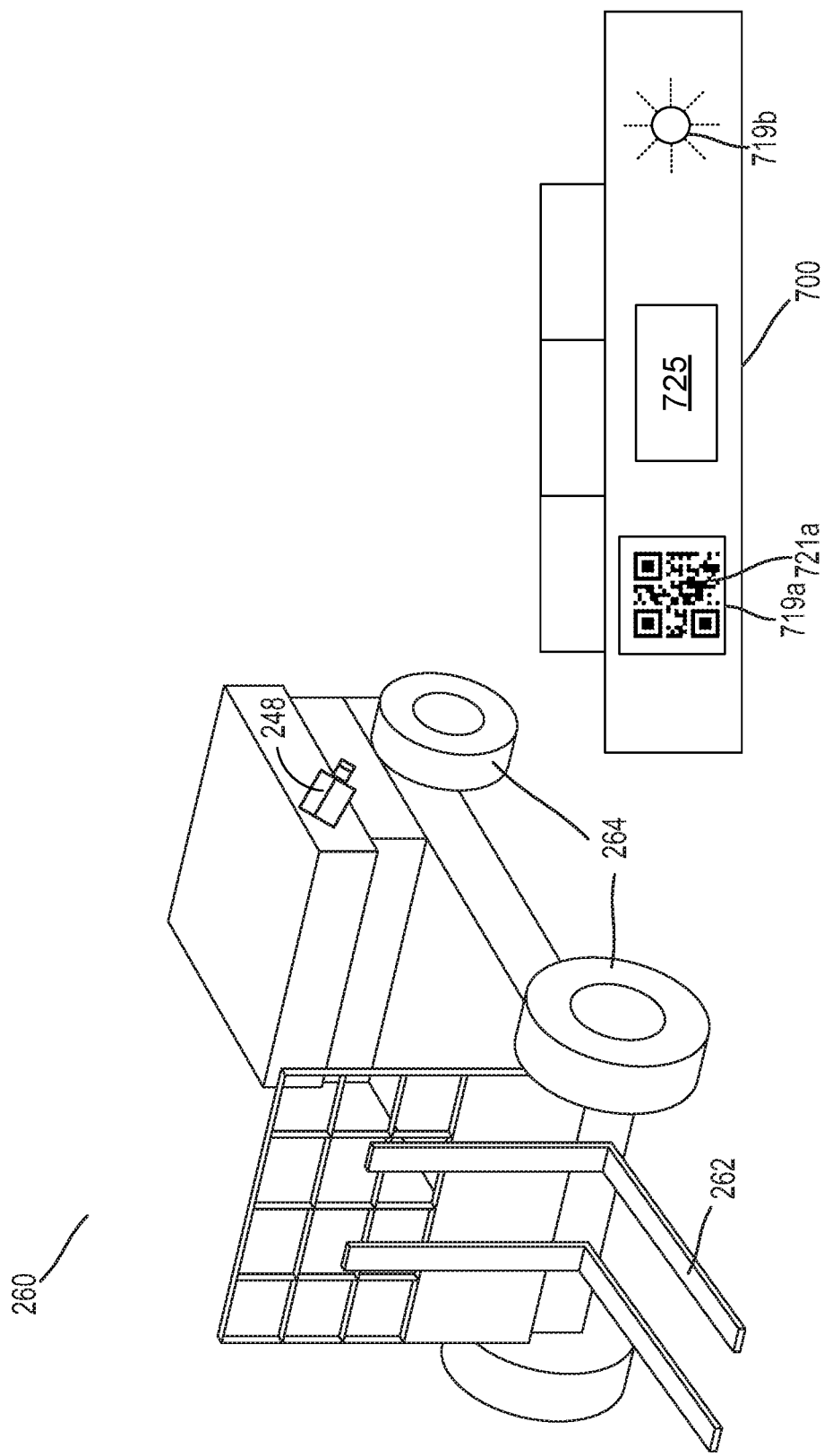
FIG. 7 shows an example autonomous fork truck and an example pallet, according to an example embodiment.

The method 400 may further involve storing data indicating an association between a third optical identifier and a pallet. For example, the control system 150 may store data in its database that associates pallet 700 of FIG. 7 with a third optical identifier 721a displayed by a display screen 719a. The display screen 719a may be controlled by a computing device 725 that is associated with the pallet 700. The computing device 725 may include a wireless communication interface configured for receiving data from or sending data to the control system 150 or any robots of the robotic fleet 100.

The method 400 may further involve sending, to a computing device associated with the pallet, data encoding the third optical identifier for display by the computing device. For example, the control system 150 may send data encoding the third optical identifier 721a to the computing device 725 so that the computing device 725 may cause the display screen 719a to display the third optical identifier 721a. In another example, the control system 150 may send data encoding a third optical identifier (e.g., pulses of visible and/or infrared light) for display by the light source 719b. The light source 719b may be similar to the light source 219b of FIG. 2A, for example.

The method 400 may further include, after sending the data encoding the third optical identifier, sending, to a given robot, the data indicating the association between the third optical identifier and the pallet. For example, the control system 150 may send, to the autonomous fork truck 260 of FIG. 2D, data indicating the association between the third optical identifier 721a and the pallet 700 so that the autonomous fork truck 260 may identify the pallet 700 by capturing an image of the third optical identifier 721a. This may help the autonomous fork truck 260 in finding the correct pallet for loading or unloading one or more items.

The method 400 may further involve receiving, from the given robot, a message that includes data encoding the third optical identifier. In this context, sending the data indicating the association between the third optical identifier and the pallet comprises sending the data indicating the association between the third optical identifier and the pallet in response to receiving the message.

For example, the control system 150 may receive a message from the autonomous fork truck 260. The message may include a request for the control system 150 to identify the pallet 700 that is displaying the third optical identifier 721a. The control system may send, to the autonomous for truck 260, the data indicating the association between the third optical identifier 721a and the pallet 700 in response to receiving the message from the autonomous fork truck 260.

In some embodiments, a fixed object within the warehouse 100, such as a battery exchange/charging station 126 (or another sort of docking station), a pedestal robot 122, or any other fixed object within the environment of the robot may display an optical identifier similar to the optical identifiers described herein. In such an example, the control system 150 might send data encoding the optical identifier to the fixed object so that a computing device and a display screen corresponding to the fixed object may display the optical identifier. In other examples, movable (i.e., non-fixed) objects within the warehouse 100 may also display an optical identifier in accordance with any applicable functions described herein. A robot moving past the fixed object may detect the optical identifier displayed by the fixed object and, based on data received by the robot from the control system 100 either before or after detecting the optical identifier, may recognize the detected optical identifier as a command. The robot may execute a function in accordance with the command. In other examples, the optical identifier may represent information other than a command.

In some examples, the optical identifier may represent a command for a robot to slow down, speed up, dock with the object, move toward the object, not dock with the object, move away from the object, halt, etc. The optical identifier may represent similar commands for robots as well.

In an example where the object is a a battery exchange/charging station 126, the battery exchange/charging station 126 may display an optical identifier indicating whether the battery exchange/charging station 126 has a charged battery for exchange with a robot. In an example where a battery of the robot is running low on power, the robot may detect an optical identifier conveying that the battery exchange/charging station 126 does have a charged battery for exchange, and the robot may dock with the battery exchange/charging station 126 and exchange its drained battery for a charged battery. If optical identifier indicates that the battery exchange/charging station 126 does not have a charged battery for exchange, the robot may search for another battery exchange/charging station 126 that does have a charged battery for exchange.

In another example, a "signpost" may include a computing device and a display screen positioned at an area of the warehouse 100 where robots often travel. At times, the display screen may display an optical identifier representing robot traffic conditions. If robot traffic near the area is heavy, the display screen may display an optical identifier conveying a command for robots in the area to travel at a lower than normal speed to avoid collisions between the robots. Likewise, if robot traffic near the area is light, the display screen may display an optical identifier conveying a command for robots in the area to travel at a higher than normal speed. The control system 150 may monitor robot traffic conditions at that area and send data encoding optical identifiers representing robot traffic conditions to the signpost for display. Before or after the robot detects such an optical identifier, the control system 150 may send data to the robot conveying the meaning of such optical identifiers so that the robot may react accordingly.

Referring to FIG. 5, the method 500 may generally be performed by any robot. Any robot of the robotic fleet 100, for example, may perform the method 500 in interaction with the the control system 150.

At block 502, the method 500 may include receiving data encoding a first optical identifier of a robot. For example, the truck unloader 200 of FIG. 2A may include a wireless communication interface (not shown). The wireless communication interface may receive, from the control system 150, data encoding (i) the first optical identifier 221a to be displayed by the display screen 219a or (ii) another first optical identifier to be displayed by the light source 219b. The examples described above in regard to block 404 of the method 400 may be applicable to block 502 as well.

At block 504, the method 500 may include displaying, by the optical communication interface, the first optical identifier. For instance, the optical communication interface of truck unloader 200 may take the form of the display screen 219a or the light source 219b. The display screen 219a may display the first optical identifier 221a or the light source 219b may display a first optical identifier that identifies the truck unloader 200 in the form of a series of visible or infrared pulses of light. The optical identifier 221a may include any type of two-dimensional matrix code or any fiducial marker recognizable as identifying the truck unloader 200.

At block 506, the method 500 may include receiving data encoding a second optical identifier of the robot. For example, the truck unloader 200 may receive data encoding the second optical identifier 221b or another second optical identifier that takes the form of a series of pulses of visible or infrared light.

At block 508, the method 500 may include displaying, by the optical communication interface, the second optical identifier. For example, truck unloader 200 may receive data encoding the second optical identifier 221b for display by the display screen 219a or may receive data encoding a second optical identifier for display by the light source 219b.

The method 500 may further involve receiving data encoding a priority status of the robot. For example, the truck unloader 200 may receive data from the control system 150 indicating a level "1" priority status, which may indicate that the task the truck unloader 200 is performing is at least as important as any other task that another robot is performing. In another example, the truck unloader 200 may receive data from the control system 150 indicating a level "5" priority status, which may indicate that the task the truck unloader is performing is at least as unimportant as any other task that another robot is performing. Other scales may be used to rate the relative weight of tasks being performed by robots as well.

The method 500 may further involve displaying, by the optical communication interface, an indication of the priority status. For example, the display screen 219a of the truck unloader 200 may display the indication of the priority status (which may or may not be included within the first optical identifier 221a). In another example, the light source 219b may display the indication of the priority status (which may or may not be included within the first optical identifier displayed by the light source 219b.) In this way, the control system 150 or other robots may detect the indication of the priority status and perform particular actions accordingly, as described below.

Referring to FIG. 6, the method 600 may generally be performed by any robot. Any robot of the robotic fleet 100, for example, may perform the method 600 in interaction with any other robot of the robotic fleet 100 or the the control system 150.

Figure 8:
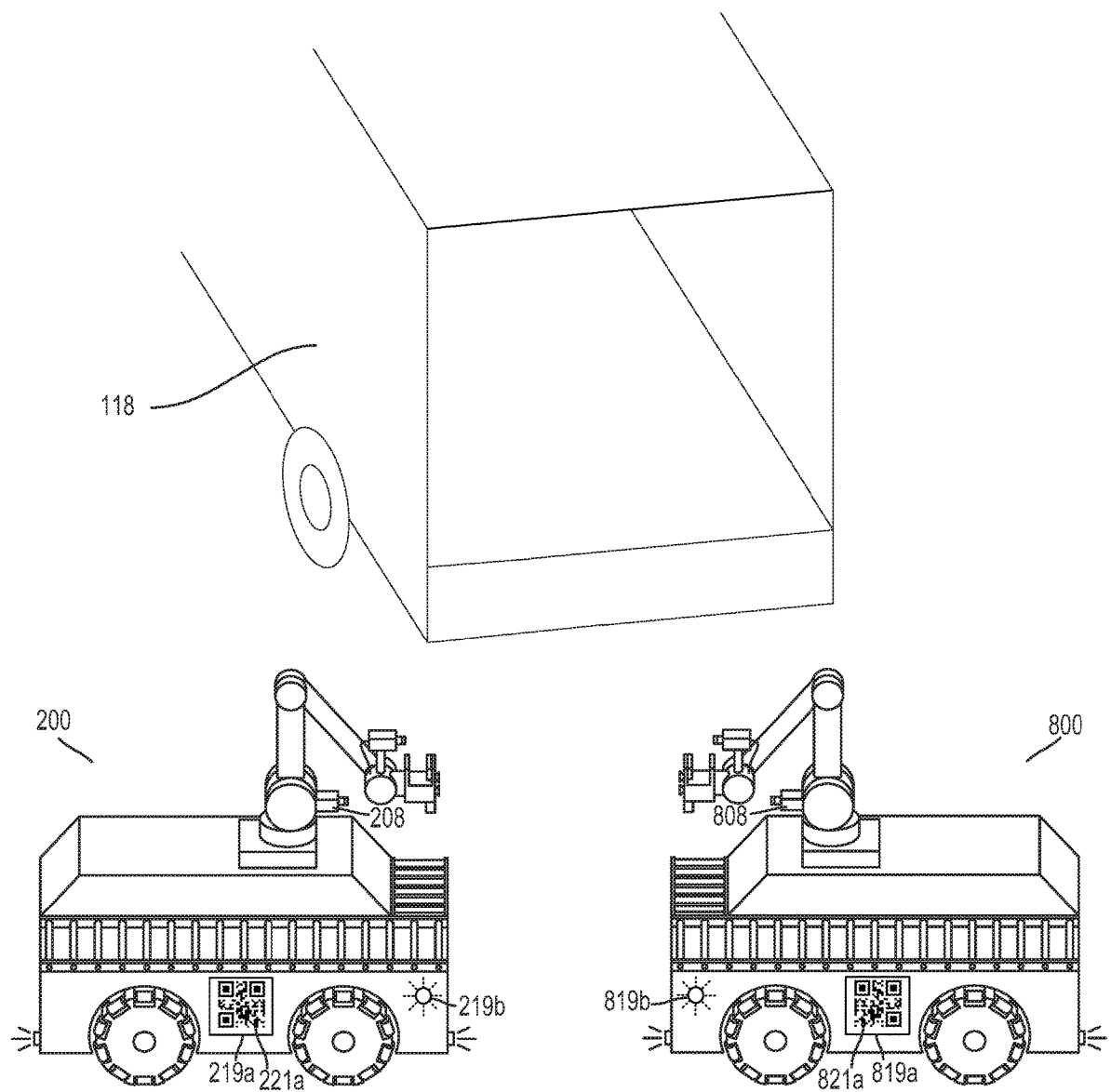
FIG. 8 shows example truck (un)loaders and an example delivery truck, according to an example embodiment.

At block 602, the method 600 may include receiving, from a control system, data encoding a first priority status of the first robot. Referring to FIG. 8 for example, a first truck unloader 200 may receive, from the control system 150, data encoding a first priority status of the first truck unloader 200. The first priority status of the first truck unloader 200 may reflect the relative importance of the task the first truck unloader 200 is to perform on a scale of 1 (highest priority) to 5 (lowest priority), for example.

At block 604, the method 600 may include capturing an image of an indication of a second priority status of a second robot. In this context, the indication may be displayed by the second robot as the indication is captured. For example, the first truck unloader 200 may use camera 208 to capture an image of a second priority status indicator 821a. The second priority status indicator 821a may be displayed by a display screen 819a of a second truck unloader 800. In another example, the camera 208 may capture an image of a second priority status indicator that is displayed by the light source 819b. The second priority status indicator displayed by the light source 819b may include a series of pulses of visible and/or infrared light, as described in examples above. The second priority status of the second truck unloader 800 may reflect the relative importance of the task the second truck unloader 800 is to perform on a scale of 1 (highest priority) to 5 (lowest priority), for example.

At block 606, the method 600 may include determining the second priority status by identifying the indication within the captured image. For example, the truck unloader 200 may use known image processing techniques to identify the second priority status indicator 821a (or the second priority status indicator displayed by the light source 819b) within the image captured by the camera 208.

At block 608, the method 600 may include comparing the first priority status to the second priority status. In one example, comparing the first priority status to the second priority status may include determining that the first priority status is higher than the second priority status. For instance, the truck unloader 200 may determine the second priority status of the second truck unloader 800 to be "3" based on the second priority status indicator. If the first priority status of the first truck unloader 200 is "1," the first truck unloader 200 may determine that the task to be performed by the first truck unloader 200 is more important than the task to be performed by the second truck unloader 800.

In another example, comparing the first priority status to the second priority status may include determining that the first priority status is lower than the second priority status. For instance, the truck unloader 200 may determine the second priority status of the second truck unloader 800 to be "3" based on the second priority status indicator. If the first priority status is "5," the first truck unloader 200 may determine that the task to be performed by the first truck unloader 200 less important than the task to be performed by the second truck unloader 800.

At block 610, the method 600 may include performing an action based on comparing the first priority status to the second priority status. More specifically, the first truck unloader 200 and the second truck unloader 800 may approach each other as they navigate their own respective paths to complete respective tasks. In the case where the first priority status is higher than the second priority status, the second truck unloader 800 may yield to the first truck unloader 200 so that the first truck unloader 200 may move past the second truck unloader 800. In the case where the first priority status is lower than the second priority status, the first truck unloader 200 may yield to the second truck unloader 800 so that the second truck unloader 800 may move past the first truck unloader 200.

In another example, performing the action may include retrieving a first item from a third robot after the second robot retrieves a second item from the third robot. In the case where the first priority status is higher than the second priority status, the first truck unloader 200 may proceed to load or unload items onto or from the delivery truck 118 before the second truck unloader 800 performs such actions. In the case where the first priority status is lower than the second priority status, the second truck unloader 800 may proceed to load or unload items onto or from the delivery truck 118 before the first truck unloader 200 performs such actions.

In general, robots may communicate with each other by displaying and detecting optical identifiers. For example a first robot may display an optical identifier so that a second robot may detect the optical identifier. This method of communication may be useful if conventional wireless or wired communication between the robots fails or experiences unpredictable latency. For example, when two robots interact to perform a task it may be useful to communicate using optical identifiers. Using optical identifiers as a means for communication, while perhaps slower on average than conventional wired or wireless communication, in some cases might be more reliable and/or predictable.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium such as a storage device including a disk or hard drive or other storage medium.

The computer-readable medium may also include non-transitory computer-readable media such as computer-readable media that stores data for short periods of time like register memory, processor cache, and random access memory (RAM). The computer-readable media may also include non-transitory computer-readable media that stores program code and/or data for longer periods of time, such as secondary or persistent long term storage, like read only memory (ROM), optical or magnetic disks, compact-disc read only memory (CD-ROM), for example. The computer-readable media may also be any other volatile or non-volatile storage systems. A computer-readable medium may be considered a computer-readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the Figures should not be viewed as limiting. It should be understood that other embodiments can include more or less of each element shown in a given figure. Further, some of the illustrated elements can be combined or omitted. Yet further, an example embodiment can include elements that are not illustrated in the Figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A control system comprising:
  one or more processors; and
  a computer-readable storage medium storing instructions that, when executed by the one or more processors, cause the control system to perform functions comprising:

storing data indicating an association between an optical identifier and a pallet:

sending, to a computing device associated with the pallet, data encoding the optical identifier for display by the computing device; and after sending the data encoding the optical identifier, sending, to a robot, the data indicating the association between the optical identifier and the pallet.

2. The control system of claim 1, wherein the optical identifier comprises a two-dimensional matrix code.

3. The control system of claim 1, wherein the optical identifier comprises one or more of (a) pulses of infrared light or (b) pulses of visible light.

4. The control system of claim 1, the functions further comprising:

receiving, from the robot, a message that includes data encoding the optical identifier, wherein sending the data indicating the association between the optical identifier and the pallet comprises sending the data indicating the association between the optical identifier and the pallet in response to receiving the message.

5. The control system of claim 1, wherein sending, to the robot, the data indicating the association between the optical identifier and the pallet is performed in response to receiving a request from the robot to identify the pallet.

6. A method comprising:

storing data indicating an association between an optical identifier and a pallet;

sending, to a computing device associated with the pallet, data encoding the optical identifier for display by the computing device; and after sending the data encoding the optical identifier, sending, to a robot, the data indicating the association between the optical identifier and the pallet.

7. The method of claim 6, wherein the optical identifier comprises a two-dimensional matrix code.

8. The method of claim 6, wherein the optical identifier comprises one or more of (a) pulses of infrared light or (b) pulses of visible light.

9. The method of claim 6, further comprising:

receiving, from the robot, a message that includes data encoding the optical identifier, wherein sending the data indicating the association between the optical identifier and the pallet comprises sending the data indicating the association between the optical identifier and the pallet in response to receiving the message.

10. The method of claim 6, wherein sending, to the robot, the data indicating the association between the optical identifier and the pallet is performed in response to receiving a request from the robot to identify the pallet.

11. The method of claim 6, wherein the optical identifier is displayed by a light source on the pallet.

12. The method of claim 6, wherein the optical identifier is displayed on a display screen on the pallet.

13. The method of claim 6, wherein the robot is an autonomous fork truck.

14. The method of claim 6, wherein the robot identifies the pallet by capturing an image of the optical identifier.

15. The method of claim 6, wherein the method is performed by a control system that communicates with the computing device associated with the pallet using a wireless communication interface of the computing device.

16. A computer-readable storage medium storing instructions that, when executed by one or more processors, cause the one or more processors to perform functions comprising:

storing data indicating an association between an optical identifier and a pallet;

sending, to a computing device associated with the pallet, data encoding the optical identifier for display by the computing device; and after sending the data encoding the optical identifier, sending, to a robot, the data indicating the association between the optical identifier and the pallet.

17. The computer-readable storage medium of claim 16, wherein the optical identifier comprises a two-dimensional matrix code.

18. The computer-readable storage medium of claim 16, wherein the optical identifier comprises one or more of (a) pulses of infrared light or (b) pulses of visible light.

19. The computer-readable storage medium of claim 16, the functions further comprising:

receiving, from the robot, a message that includes data encoding the optical identifier, wherein sending the data indicating the association between the optical identifier and the pallet comprises sending the data indicating the association between the optical identifier and the pallet in response to receiving the message.

20. The computer-readable storage medium of claim 16, wherein sending, to the robot, the data indicating the association between the optical identifier and the pallet is performed in response to receiving a request from the robot to identify the pallet.

* * * * *